United States Patent [19]

Fujiwara et al.

[11] Patent Number: 5,471,580
[45] Date of Patent: Nov. 28, 1995

[54] HIERARCHICAL NETWORK HAVING LOWER AND UPPER LAYER NETWORKS WHERE GATE NODES ARE SELECTIVELY CHOSEN IN THE LOWER AND UPPER LAYER NETWORKS TO FORM A RECURSIVE LAYER

[75] Inventors: Shinji Fujiwara, Kokubunji, Japan; Yoichi Shintani, Palo Alto, Calif.; Mitsuru Nagasaka, Kodaira, Japan

[73] Assignee: Hitachi, Ltd., Tokyo, Japan

[21] Appl. No.: 954,025

[22] Filed: Sep. 30, 1992

[30] Foreign Application Priority Data

Oct. 1, 1991  [JP]  Japan ..................... 3-280748

[51] Int. Cl.$^6$ ..................... G06F 9/00
[52] U.S. Cl. ............... 395/200.02; 364/242.94; 364/242.96; 364/G242.5; 364/DIG. 1; 395/800; 395/200.15
[58] Field of Search ................ 395/200, 800; 607/14; 370/94.3, 60, 92, 93, 94.1

[56] References Cited

U.S. PATENT DOCUMENTS

| | | | |
|---|---|---|---|
| 4,644,496 | 2/1987 | Andrews | 395/200 |
| 4,814,980 | 3/1989 | Peterson et al. | 395/200 |
| 5,105,424 | 4/1992 | Flaig et al. | 370/94.1 |
| 5,170,482 | 12/1992 | Sho et al. | 395/800 |

FOREIGN PATENT DOCUMENTS 56-201931  4/1981  Japan .

OTHER PUBLICATIONS

*Information Processing*, "Coupling System", K. Kurokawa, et al., vol. 27, No. 9, Sep. 1989.

"BBN TC2000 Architecture and Programming Models", E. D. Brocks, et al., Proc. of COMPCOM 1991.

*IEEE Transactionson Computers*, "Performance Analysis of K–array n–cube Interconnection Network", vol. 39, No. 6, Jun. 1990.

IEE Transactions on Parallel & Distributed Systems, vol. 3, No. 1, Jan. 1992, "Extended Hypercube: A Hierarchical Interconnection Network of Hypecubes", J. Mohan Kumar & L. M. Patnaik.

*Primary Examiner*—Thomas C. Lee
*Assistant Examiner*—Sang Hui Kim
*Attorney, Agent, or Firm*—Antonelli, Terry, Stout & Kraus

[57] ABSTRACT

A hierarchical network hierarchically connects a plurality of networks whose nodes are mutually connected by connection paths as a p-array n-dimensional cube to configure a single network. A plurality of nodes are selected from lower layer p-array n-dimensional cubes, and the selected gate nodes are mutually connected as a p-array m-dimensional cube to configure a p-array m-dimensional network on the next layer. Similarly, gate nodes are selected from a plurality of next-layer p-array m-dimensional networks, and mutually connected as a p-array l-dimensional cube to configure a p-array l-dimensional network in a further upper layer, thereby configuring a single hierarchical network as a whole.

10 Claims, 18 Drawing Sheets

FIG. IE
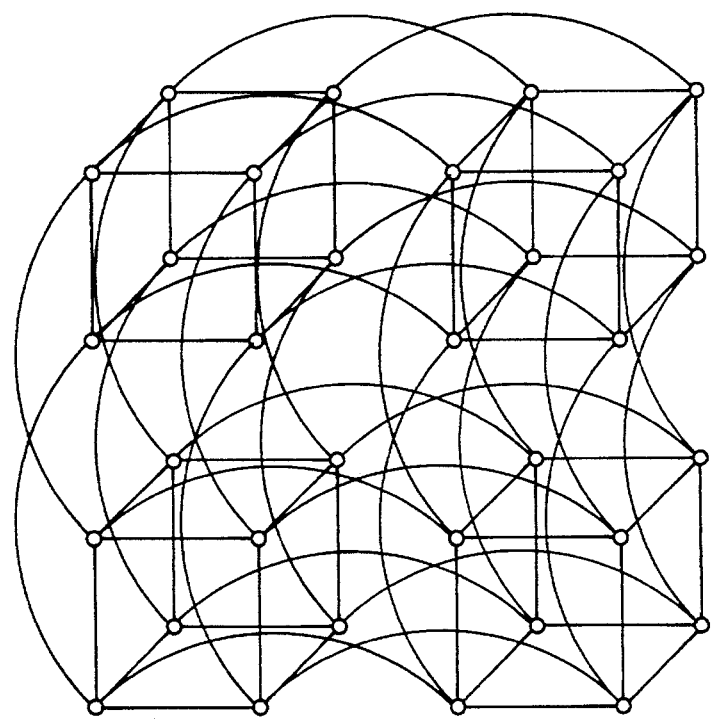
FIG. 2
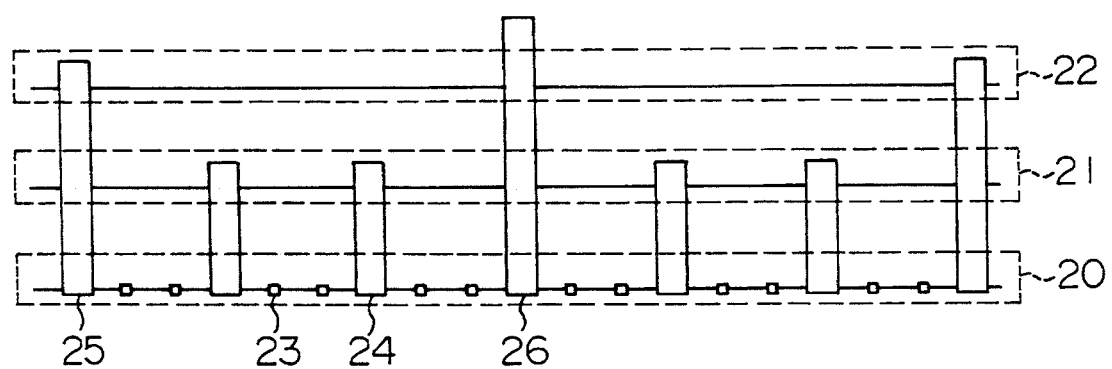

FIG. 7A
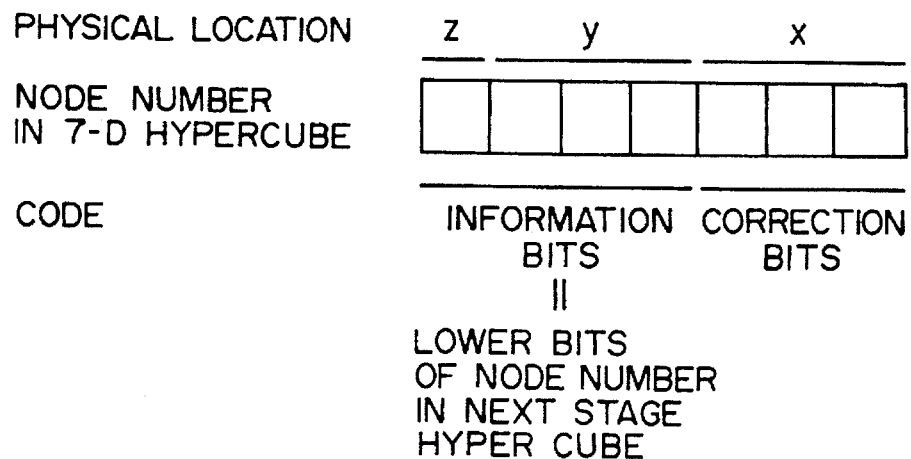
FIG. 7B
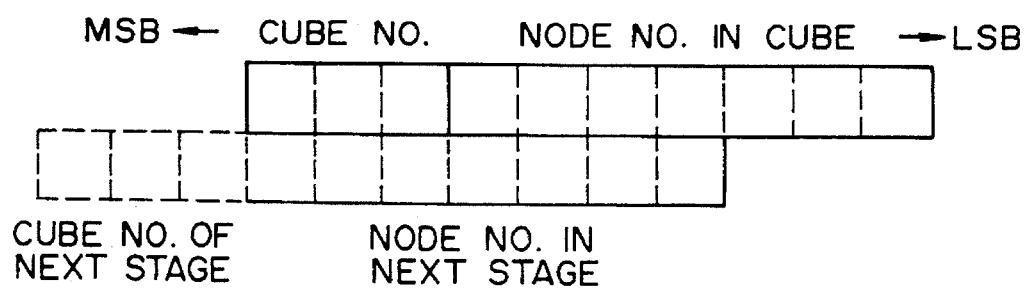
FIG. 7C
G : GATE NODE
L : LEAF NODE  | 0~7 | 0~F | 0~7 |

| CNO | PNO | LNO | NLNO | CNO | PNO | LNO | NLNO |
|---|---|---|---|---|---|---|---|
| 0 | 00 | 0 | 0 | 2 | 20 | 0 | 4 |
|   | 01 | 1 | — |   | 21 | 1 | — |
|   | 02 | 2 | — |   | 22 | 2 | — |
|   | 03 | 3 | — |   | 23 | 3 | — |
|   | 04 | 4 | — |   | 24 | 4 | — |
|   | 05 | 5 | — |   | 25 | 5 | — |
|   | 06 | 6 | — |   | 26 | 6 | — |
|   | 07 | 7 | 1 |   | 27 | 7 | 5 |
| 1 | 10 | 0 | 2 | 3 | 30 | 0 | 6 |
|   | 11 | 1 | — |   | 31 | 1 | — |
|   | 12 | 2 | — |   | 32 | 2 | — |
|   | 13 | 3 | — |   | 33 | 3 | — |
|   | 14 | 4 | — |   | 34 | 4 | — |
|   | 15 | 5 | — |   | 35 | 5 | — |
|   | 16 | 6 | — |   | 36 | 6 | — |
|   | 17 | 7 | 3 |   | 37 | 7 | 7 |

PNO  PROCESSOR NO.
CNO  CUBE NO.
LNO  NO. IN CUBE
NLNO  NO. IN NEXT CUBE STAGE 8 x 8 HYPER CROSSBAR

2-D TORUS NETWORK

BINARY TREE NETWORK

FIG. 18A

| TYPE | n-D HYPERCUBE | 8 ARRAY k-D HXB | m-LEVEL (7,4) CCN | m-LEVEL (3,1) CCN |
|---|---|---|---|---|
| NUMBER OF LINKS | $2^n$ | $2^{3n}$ | $2^{3m+4}$ | $2^{2m+1}$ |
| AVERAGE OF LINKS | $n$ | $2k+1$ | $\dfrac{2^7 \times (8^m - 1)}{2^{(3m+4)}}$ | $\dfrac{2^3 \times (4^m - 1)}{2^{(2m+1)}}$ |

FIG. 19A

| TYPE | n-D HYPERCUBE | 8 ARRAY k-D HXB | m-LEVEL (7,4) CCN | m-LEVEL (3,1) CCN |
|---|---|---|---|---|
| NUMBER OF NODES | $2^n$ $(n>2)$ | $2^{3n}$ | $2^{3m+4}$ | $2^{2m+1}$ |
| NUMBER OF INTERMODULE LINKS (8 NODE MODULE) | $8(n-3)$ | $14(k-1)$ | $4+7(m-1)$ | $\begin{array}{l}0 \quad (m=1)\\ 2+3(m-2) \ (m \geq 2)\end{array}$ |

HIERARCHICAL NETWORK HAVING LOWER AND UPPER LAYER NETWORKS WHERE GATE NODES ARE SELECTIVELY CHOSEN IN THE LOWER AND UPPER LAYER NETWORKS TO FORM A RECURSIVE LAYER

BACKGROUND OF THE INVENTION

1. Field of the Invention

The present invention relates to a hierarchical network with a reduced number of internode paths and a multiprocessor system utilizing the same.

2. Description of the Related Art

Investigation has hitherto been made on a network for coupling a plurality of nodes, and a variety of networks have been devised. These node coupling system are introduced in an explanation article "Coupling System" by Kyoichi Kurokawa et al. (Information Processing, vol. 27, No. 9, Sep. 1989, pp. 1005–1021). In this explanation, networks are classified into "dynamic" networks and "static" networks depending on whether or not coupling between input and output dynamically changes. The dynamic networks include a crossbar network, a baseline network, an omega network, a butterfly network (indirect n-cube), a delta network, Banyan network and so on. On the other hand, the static networks include a ring network, a star network, a tree network, a lattice network, a perfect coupling network, an n-cube, a CCC (Cube Connected Cycle) and so on.

In the field of computer architecture, a variety of multiprocessor systems have been investigated and developed applying the above-mentioned networks. Typical one of these multiprocessor systems may be TC2000 (by BBN in USA) utilizing a butterfly network described in an article "BBN TC2000 Architecture and Programming Models" by E. D. Brocks et al (Porc. of COMPCON '91, pp. 46–50, 1991). Also given as an example is a multiprocessor system utilizing a tree network called a duplexed Ynet which is described in JP-A-57-101931. In recent years, a hypercube (n-cube) type network is particularly drawing attention, and nCUBE (by nCUBE in USA) and iPSC (by Intel in USA) have been developed as multiprocessors to which this type of network is applied.

As stated above, the hypercube has become one of leading multiprocessor systems. Also, as a concept covering the majority of the static network, there is k-array n-cube (J. DALLY, "Performance Analysis of k-array n-cube Interconnection Network", Trans. on Computers, vol. 39, No. 6, JUNE 1990). Not only the hypercube but also the ring network, lattice network, torus network, omega network, indirect n-cube and so on are all specialized versions of this k-array n-cube or a similar type of networks thereto.

A hypercube configuring a prior art network will be briefly explained with reference to FIGS. 1A–1E. FIGS. 1A–1E illustrate two-dimensional, three-dimensional, four-dimensional and five-dimensional hypercubes, respectively. The number of nodes N and the number of internode connection buses from one node M are set to N=2 and M=2 in the one-dimensional hypercube; N=4 and M=2 in the two-dimensional hypercube; N=8 and M=3 in the three-dimensional hypercube; N=16 and M=4 in the four-dimensional hypercube; N=32 and M=5 in the five-dimensional hypercube; and N=2^n (an operator "^" represents a power) and M=n in an n-dimensional hypercube. In the prior art hypercube, as the number of nodes N is increased, the number of internode connection buses MM is also increased. For example, in a hypercube having the number of nodes equal to N=2^n, MM=(Nlog$_2$N)/2. For example, in the one-dimensional hypercube shown in FIG. 1A, since N=2, MM=(2log$_2$2)/2=1; in the two-dimensional hypercube shown in FIG. 1B, since N=8, MM=(8log$_2$8)/2=12; and when the number of nodes N is equal to 2^16, MM=524,288. Thus, as the number of nodes is increased, the resulting number of internode connection buses becomes immense. For this reason, it is practically difficult to configure a multiprocessor system utilizing this network so as to allocate a processor to each node.

To solve this problem, the foregoing CCC network or the like has been devised which forms a ring with nodes located at respective peaks of a hypercube (described in the foregoing explanation article, p1027). However, this network has a drawback that an internode transfer distance becomes longer than another type of hypercube having a similar number of nodes depending on the positions of nodes. Although a tree network, which is a hierarchical network described in the foregoing explanation article, p1014, can reduce the number of internode connection buses, it has a drawback that the internode transfer distance becomes longer, similarly to the CCC. For example, in an n-stage binary tree network having the number of nodes equal to (2^n)−1, the internode transfer distance is doubled as compared with an n-dimensional hypercube having the substantially same number of nodes. In a multiprocessor system, an interprocessor communication time is very important. The interprocessor communication time generally increases in proportion to the distance of an internode transfer path. In a hypercube network, assuming that the number of node N is equal to 2^n (N=2^n), a maximum value Dmax of the internode transfer distance is expressed by Dmax=log$_2$N. For example, in a system having the number of nodes equal to 2^16 (N=2^16), its maximum transfer distance is 16 (Dmax=16).

A multiprocessor utilizing a hypercube network also has a problem in the expansibility. Specifically, if a processor is added to an arbitrary hypercube system, existing processors must be additionally provided with a network connection port corresponding to the added processor. It is therefore impossible to practically add processors more than the previously designed number of ports.

Further, in a tree network, since a transfer path is uniquely determined, communication paths frequently fall into a closed stage, thereby hindering a parallel transfer of data.

In addition, for building a large scale multiprocessor system employing a plurality of one module/chip multiprocessor systems in which a plurality of processors are mounted on a single module or LSI chip, the following problems may arise. Assume, for example, that a multiprocessor system comprising 2^16 units of processors is realized by applying a plurality of one-chip multiprocessors containing, for example, 128 (=2^7) processors to a hypercube network. If 2^9 units of the chips are used to build a 16-dimensional hypercube system, the number of internode connection buses equal to 1,152 must be drawn from one chip, which apparently results difficulties in providing the chip with such a large number of pins. Such a situation presents a more grave problem as the number of used processors and accordingly the scale of a built system are increased.

SUMMARY OF THE INVENTION

It is an object of the present invention to provide a hierarchical network which can be configured with a reduced number of internode connection buses when configuring a network having a large number of nodes.

It is another object of the present invention to provide a hierarchical network which is capable of reducing a maximum internode communication distance.

It is a further object of the present invention to provide a hierarchical network having a reduced number of internode connection buses and a maximum internode transfer distance similar to or less than a single-layer network having the same number of node by applying a coding theory to a procedure of selecting a plurality of nodes belonging to an upper layer network from nodes in lower layer networks.

It is also an object of the present invention to provide a communication system for use in the above-mentioned novel hierarchical network.

It is a further object of the present invention to provide a multiprocessor system employing such a novel hierarchical network.

It is a further object of the present invention to provide a multiprocessor system which presents an excellent expansibility by employing a hierarchical type network.

It is a further object of the present invention to provide a multiprocessor system which is capable of avoiding the problem of a large number of pins otherwise required to modules or semiconductor chips by reducing the number of connection buses between the respective modules or semiconductor chips, when a plurality of processors are mounted on a single module or semiconductor chip and a plurality of these modules are combined to build a large scale multiprocessor system.

In the present invention, a plurality of nodes are selected, as nodes in an upper layer network, from each of a plurality of lower layer networks each having a plurality of nodes (the selected node is hereinafter referred to as "the gate node"). Gate nodes belonging to a particular lower network are interconnected such that a communication distance therebetween becomes shorter than a communication distance in the lower layer network. Gate nodes belonging to different lower layer networks are interconnected so as to enable communications therebetween. Thus, a hierarchical network is provided which reduces a transfer distance in a particular lower layer network while ensures a transfer between nodes belonging to different lower layer networks.

Also in the present invention, each node in a plurality of p-array n-dimensional lower layer networks is given a p-array n-digit node number which is determined uniquely in all the lower layer networks. Nodes which are given node numbers corresponding to code words when these node numbers are regarded as codes are selected as gate nodes, and the gate nodes are mutually connected as nodes in a p-array m-dimensional upper layer network. As a result, a network is provided which has a number of internode connection buses less than and a communication distance equal to or less than a p-carry cube having the same number of nodes.

The present invention further provides a network where a node number uniquely given to each node in each of a plurality of lower layer networks is regarded as a code, such that nodes whose node number is a code word of a t-multiplexed error correcting code are selected as gate nodes, and a hierarchical network is built by these gate nodes, whereby the number of internode connection buses is reduced and a communication distance is equal to or less than a single-layer network having the same number of nodes.

The present invention provides a multiprocessor system where processors are located at the nodes of the networks.

The present invention can provide the above-mentioned multiprocessor system where nodes selected as gate nodes are each composed of main storage sharing multiprocessors and each of other nodes (hereinafter referred to as "the leaf node") of a single processor, thereby presenting an excellent expansibility.

In the present invention, as an interprocessor communication method for the multiprocessor system, when data is transferred from a processor located at a node, the shortest path in a lower layer network is used to transfer data between nodes belonging to the same lower layer network, while a gate node connected to an upper layer network is used to transfer data therethrough to nodes belonging to another network.

Further, when a t-multiplexed error correcting code is used as a means for selecting gate nodes for building the foregoing hierarchical network, a path from a leaf node a to a gate node b is specified in the following manner. A node number in a lower layer network given to the leaf node a is regarded as a code, and this code is corrected by an error correcting means in accordance with the t-multiplexed error correcting code to derive a code word of the code. A node which is given the derived code word is selected to be the gate node b, and data is transferred through a path from the leaf node a to the gate node b thus selected.

As is apparent from the above explanation, the present invention provides a quite novel hierarchical network topology. The topology having hypercubes therein has better performance than a conventional hypercube with respect to any of the number of internode connection paths, expansibility, the number of intermodule connection paths, and a data transfer distance in a large scale multiprocessor system comprising the number of processors ranging from 50,000 to several million or more.

BRIEF DESCRIPTION OF THE DRAWINGS

FIGS. 1A–1E are diagrams for explaining hypercubes;

FIG. 2 is a diagram illustrating the relationship between stages of a multi-stage coding cube network;

FIGS. 7A–7C are diagrams for explaining how to give node numbers to nodes in the multi-stage (7, 4) code cube;

FIG. 18A is a table showing the number of average links of a variety of networks;

FIG. 19A is a table showing the result of an evaluation on the number of intermodule links for the respective networks;

DESCRIPTION OF THE PREFERRED EMBODIMENTS

Figure 1A:
Figure 1B:
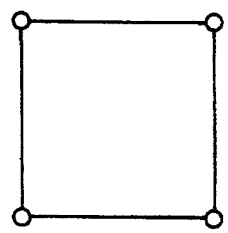
Figure 1C:
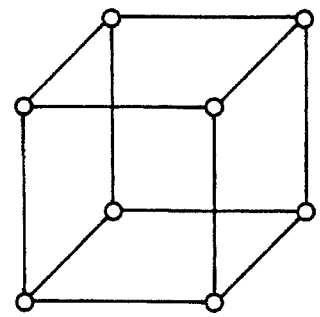
Figure 1D:
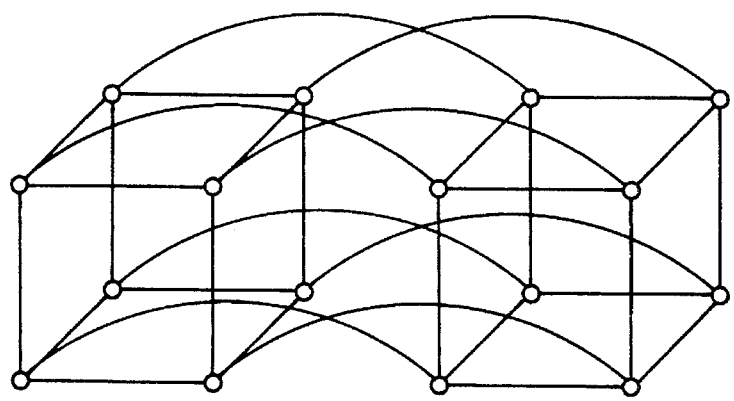

A hierarchical network according to the present invention and a multiprocessor system utilizing the same will hereinafter be described in detail with reference to the accompanying drawings.

In the present invention, an m-dimensional hypercube is employed as a basic network, wherein some nodes are selected from each of a plurality of the basic networks (selected nodes are hereinafter referred to as "the gate node"), and the selected gate nodes constitute an upper level network. This upper level network is used as a basic network for the next stage, thus repeating the same processing to configure a hierarchical network.

Generally, if a p-carry number of n digits is regarded as a code consisting of information digits and error correcting digits, the number represents a point in an error correcting coding space. For example, when each node in an m-dimensional hypercube is given a binary code as a node number, a node whose node number is a code word is selected as the gate node. Thus, each node can determine whether or not the node itself is a gate node by deciding whether or not its intranode number is an error correctable code (hereinafter referred to as "the ECC"). If a node is one other than the gate node (hereinafter referred to as "leaf node"), the node can communicate with the gate node nearest therefrom by obtaining the ECC nearest to its own intranode number.

As described above, if the coding theory is applied to the selection of a gate node, the address of the gate node nearest from a particular node can be readily obtained, and gate nodes can be uniformly selected from the basic network. A network which employs the coding theory as a method of selecting gate nodes will hereinafter be referred to as "a multi-stage coding network," and particularly a hierarchical network employing a hypercube as a basic network will be referred to as "a multi-stage coding cube network."

FIG. 2 conceptually illustrates the relationship between the respective stages of a multi-stage coding cube network. In the multi-stage coding cube network, gate nodes selected from a first stage cube 20 as a basic cube are used to build upper level or second stage hypercubes. Small squares in the figure represent leaf nodes 23 in the basic cube. The leaf nodes exist only in the basic cube in the first stage. Other rectangles represent gate nodes in the first stage. All gate nodes serve as nodes configuring the second stage cubes. In the second stage cubes, gate nodes serving as nodes in the third stage cube are selected from nodes configuring the second stage cubes. Thus, the gate node can be classified by checking to which stage of cube it belongs. In this embodiment, a gate node which serves as a node in up to the second stage cube is referred to as "the first stage gate node," and a gate node which serves as a node in up to the third stage cube as "the second stage gate node." Generally, a gate node serving as a node in up to the $n^{th}$ stage cube is referred to as the $(n-1)^{th}$ stage gate node. FIG. 2 illustrates the first stage gate node 24, the second stage gate node 25 and the third stage gate node 26.

Figure 3:
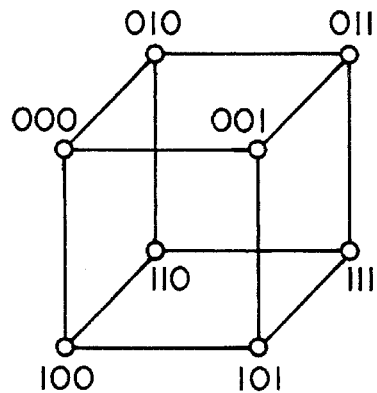
FIG. 3 is a diagram illustrating the configuration of a three-dimensional hypercube.

FIG. 3 illustrates the configuration of a three-dimensional hypercube as the basic network of the present embodiment. A three-dimensional hypercube is a network having eight nodes. In the following explanation on this embodiment, a three-dimensional hypercube is simply referred to as a cube. Description will hereinafter be made as to a method of building a network having a hierarchical configuration, i.e., a hierarchical network according to this embodiment.

Figure 4:
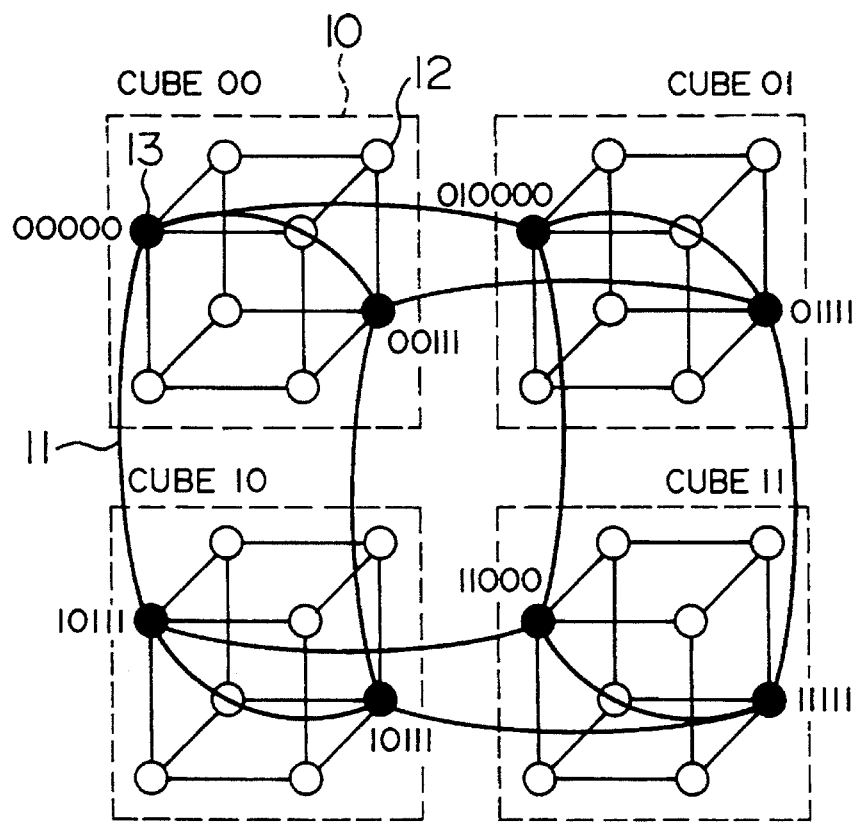
FIG. 4 is a diagram illustrating an embodiment of a multi-stage coding cube network.

FIG. 4 illustrates an embodiment of a hierarchical network according to the present invention. In this embodiment, three-dimensional hypercubes are used to realize a two-layer hierarchical network. First, four cubes are placed. In this embodiment, the three-dimensional hypercube is referred to as a basic cube. Each basic cube is given a cube number from 00 to 11. Next, a pair of nodes, which are mutually spaced by a communication distance larger than 1, are selected from each cube (nodes represented by black circles in FIG. 4). Finally, the thus selected eight nodes are connected with each other, that is, corresponding nodes of the respective basic cubes are connected, and nodes belonging to the same basic cube are also connected with each other, thereby configure a second layer three-dimensional hyper cube. In this embodiment, thus, the gate nodes selected from respective basic cubes are connected so as to configure an upper layer network, that is, a three-dimensional hypercube. Also, the gate nodes selected from the same basic network, for example, nodes 00000 and 00111 are connected with a communication distance therebetween being 3 in the basic network, whereas, with a communication distance therebetween being 1 in the upper layer network.

By the foregoing procedure, a two-layer hierarchical network can be built. In the hierarchical network according to the present invention, the gate nodes selected from a basic network are connected such that they constitute the upper layer network. As a result, the communication distance in the upper layer network between gate nodes selected from the same basic network becomes shorter than the communication distance between the same gate nodes in the basic network. Thus, the hierarchical cube network according to the present invention has a reduced number of connection paths than a hypercube network having the same number of nodes, and realizes a communication distance between nodes equal to or shorter than that in the basic hypercube.

Figure 5:
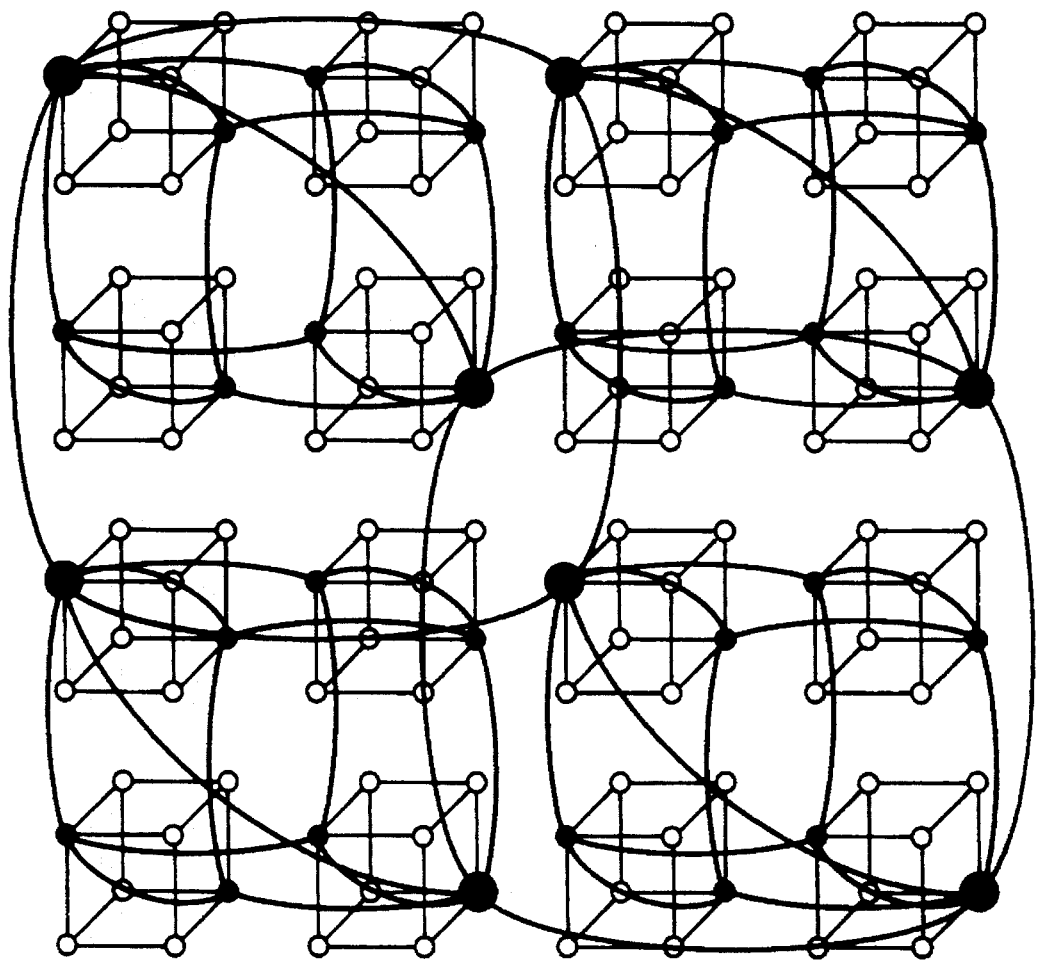
FIG. 5 is a diagram illustrating a three-layer hierarchical network configuration according to another embodiment of the present invention.

FIG. 5 illustrates an example of a three-layer hierarchical network configuration employing three-dimensional hypercubes. In this embodiment, the hierarchical network illustrated in FIG. 4 is regarded as a basic network, that is, the second layer three-dimensional hypercube is regarded as a basic network, and the third layer network is configured by the foregoing procedure. As is apparent from this embodiment, if the hierarchical network configuring method according to the present invention is repeatedly applied, a large-scale hierarchical network having a multiplicity of layers can be built.

Figure 6:
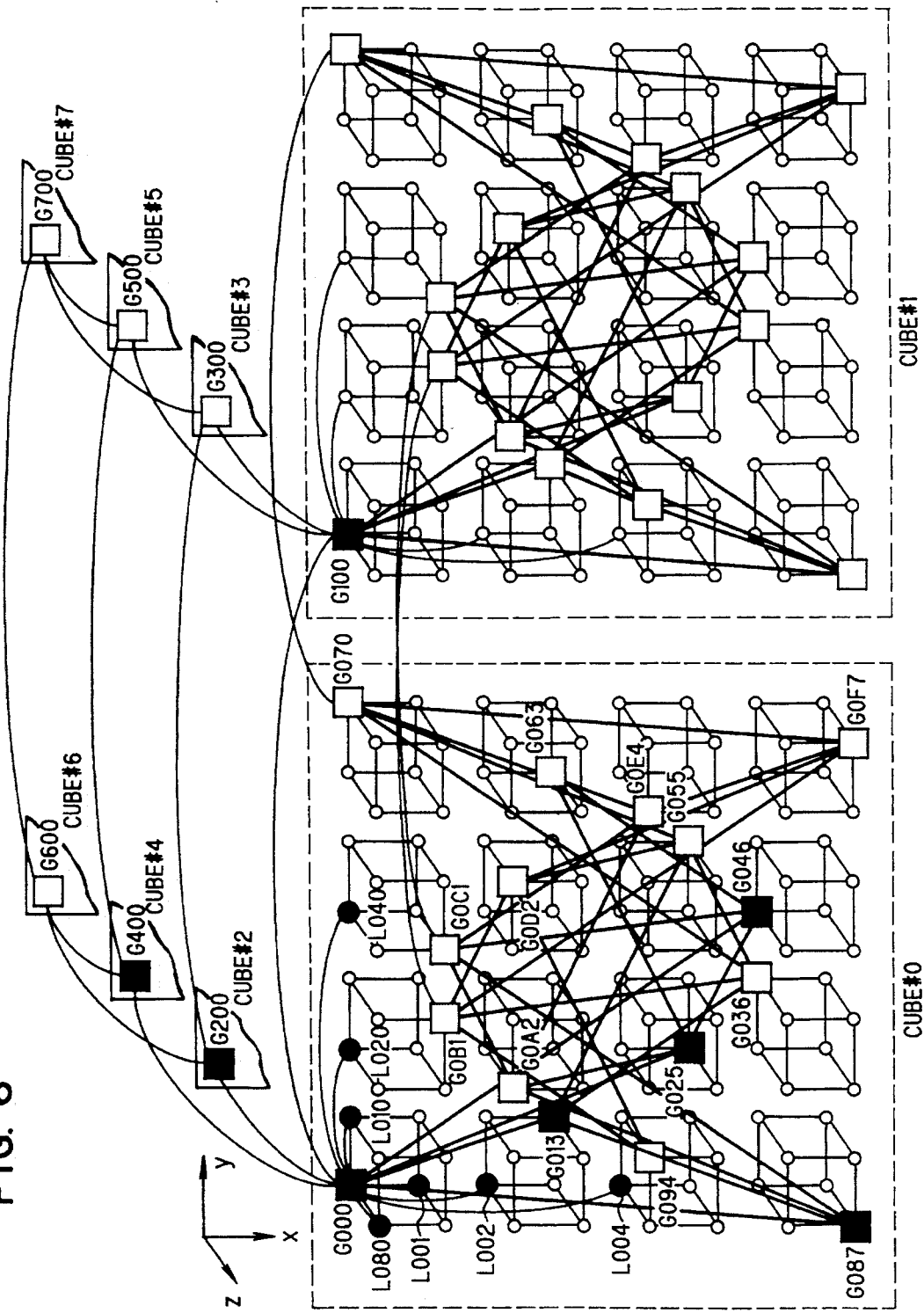
FIG. 6 is a diagram illustrating a hierarchical network which has seven-dimensional hypercubes stacked in two stages, according to another embodiment of the present invention.

FIG. 6 illustrates an example which employs another code. This embodiment shows a two-layer hierarchical network by the use of seven-dimension hypercubes.

First, eight seven-dimensional hypercubes, i.e., networks in the lowermost layer, are placed. In this embodiment, the seven-dimension hypercube is referred to as a basic cube. The basic cube shown in FIG. 6 illustrates part of connection paths of the seven-dimensional hypercube. Each basic cube is given a cube number from 0 to 7. Each basic cube has 128 (2^7) nodes. Next, 16 gate nodes are selected from 128 nodes of the respective basic cubes. In FIG. 6, selected gate nodes are shown by large squares. Since there are 128 (=16×8) gate nodes selected from the eight cubes, these nodes are connected with each other so as to configure a new seven-dimensional hypercube to build the second layer network.

Then, by repeating a processing similar to that shown in the example of the three-dimension hypercube, a multi-layer network can be configured.

Next, description will be made as to a method of selecting gate nodes suitable for use in building the hierarchical network system according to the present invention.

First, a lowermost-layer network, which serves as the base of the hierarchical network, is assumed to be a p-carry n-dimension network. This network is hereinafter referred to as "the basic network." Each node in the basic network is given a p-carry m-digit node number (address). For example, in the three-dimensional hypercube (binary three-dimensional network), each node is given a binary node number from 000 to 111. The node number thus given is divided into upper r digits and lower k digits (r+k=m), and a combination of the lower k digits is uniquely allocated to each of numbers formed of the upper r digits in conformity with the error correcting theory. Nodes having the uniquely allocated node numbers are selected as gate nodes. In the preferred embodiment, the binary three-digit node number is divided into upper one digit and lower two digits. Then, the lower two digit "00" are uniquely allocated to the upper digit when it is "0," and the lower digit "11" to the upper digit when it is "1." The nodes having the thus determined node numbers 000 and 111 are selected as the gate nodes.

The above procedure allows the gate node to be uniformly selected from the basic network. Alternatively, as a method of determining upper digit data and lower digit data corresponding thereto, there is a method which regards upper digit data as information bits and lower digit data as error detecting/correcting bits and uniquely corresponds the error detecting/correcting bits to the information bits. In the above-mentioned example, a binary majority operation code was used to select the gate nodes.

A coding method used for selecting the number of dimension of the basic cube as the basic network and the gate nodes may be identical or different between layers. In the foregoing example, it is supposed that the number of dimension and the coding method are identical in all the layers for simplicity.

FIGS. 7A–7C are diagrams for explaining how the node number is given in a hierarchical network employing a seven-dimensional hypercube, i.e., a multi-stage (7, 4) coding cube network. First, as shown in FIG. 7A, each node is given a binary seven-bit in-cube node number in conformity with the physical node location in the basic cube. In the figure, the node positions on the x-axis, y-axis and z-axis in the cube are represented by three bits, three bits and one bit, respectively, and these bits are arranged from the least significant bit in this order to form the node number in the basic cube which is given to each node. Since the network shown in this embodiment is configured by eight basic cubes connected to each other, the respective basic cubes are given cube numbers 0–7, respectively, as shown in FIG. 7B. By adding this cube number to the upper side of the node number, the unique node number is defined in the basic network. Stated another way, a node in the basic network can be specified by the format shown in FIG. 7C. Incidentally, for clarifying the following explanation, "G" or "L" is added to the head of the node number depending on whether the node is a gate node or a leaf node.

For selecting a gate node, a one-error correcting code of seven bits consisting of four information bits and three correcting bits is employed. This code is hereinafter referred to as "the (7, 4) code" (which means that the code length is seven bits and the information bit length is four bits). There are the following 16 non-error code words in the (7, 4) code:

| Information Bit | Correcting Bit | Information Bit | Correcting Bit |
|---|---|---|---|
| 0000 | 000 | 1000 | 111 |
| 0001 | 011 | 1001 | 111 |
| 0010 | 101 | 1010 | 010 |
| 0011 | 110 | 1011 | 001 |
| 0100 | 110 | 1100 | 001 |
| 0101 | 101 | 1101 | 100 |
| 0110 | 011 | 1110 | 100 |
| 0111 | 000 | 1111 | 111 |

Thus, the nodes whose numbers in the basic cube are coincident with the non-error codes are selected to be the gate nodes to configure the hierarchical network "multi-stage (7, 4) coding cube network." The network shown in FIG. 6 is a two-stage (7, 4) coding cube network.

Next, the two-stage (7, 4) coding cube network will be described with reference to FIG. 6. A gate node G000 in a cube #0 is connected to leaf nodes L001, L002, L004, L010, L020, L040 and L080. On the other hand, in the second stage seven-dimensional hypercube, the gate node G000 is connected to gate nodes G013, G025, G046 and G087. The gate node G000 is also connected to gate nodes G100, G200 and G400 in other cubes. In this manner, a gate node is connected, in the second stage network, to gate nodes in the same basic cube and gate nodes in the other three cubes which are at the corresponding locations. In other words, each gate node has seven connection paths in the basic cube and another seven connection paths in the second stage network, i.e., totally 14 connection paths.

Figure 8:
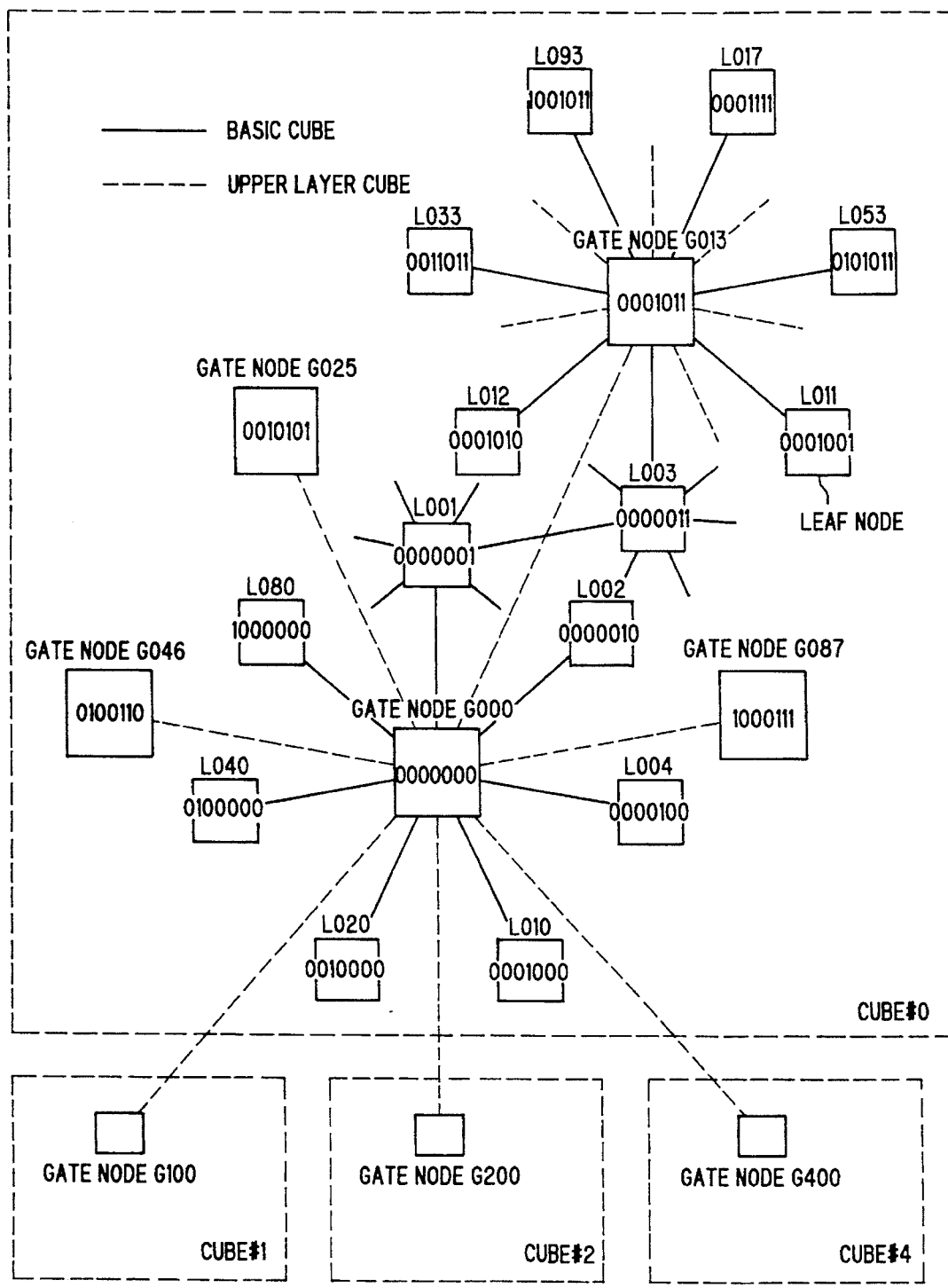
FIG. 8 is a diagram illustrating a connection state of gate nodes in the basic cube of a multi-stage (7, 4) coding cube network.

FIG. 8 illustrates in detail a connection state of gate nodes in the basic cube. If the gate nodes are selected using the (7, 4) code, a minimum distance between the gate nodes in the same cube is 3. Therefore, an arbitrary leaf node in the basic node has without fail a gate node spaced by distance 1 therefrom. For example, gate nodes G000 and G013 are spaced by distance 3 in the basic cube. Between these two gate nodes, there are leaf nodes L001, L002, L003 and so on, and a gate node exists at a location spaced by distance 1 from any of these leaf nodes. More specifically, the leaf nodes L001 and L002 are at locations spaced by distance 1 from the gate node G000, while the leaf node L003 is spaced by distance 1 from the gate node G013. It can therefore be said that a communication distance from an arbitrary node to a gate node is within distance 1 in the (7, 4) coding cube network. Also, the gate nodes spaced by communication distance 3 from each other are directly connected to each other. Therefore, one communication between the gate nodes through the second stage network corresponds to three communications in the basic cube.

By applying a multi-stage coding cube network as an interprocessor connection network for a multiprocessor system, an efficient multiprocessor system can be built. For this purpose, each node in the multi-stage coding cube network includes at least one processor, and connection between nodes serves as a communication path. Assume here that the number of dimensions of the basic cube is m, the number of nodes in the whole system is $2^n$, and $2^r$ of gate nodes are selected from each basic cube. A leaf node can be configured using the completely same procedure as that for configuring each node in a system employing an existing hypercube. More specifically, it can be configured by a processor module which has m communication ports for internode connections in the m-dimensional hypercube. The difference between the multi-stage coding cube network multiprocessor system and a conventional hypercube multiprocessor system lies in the gate node.

Figure 9:
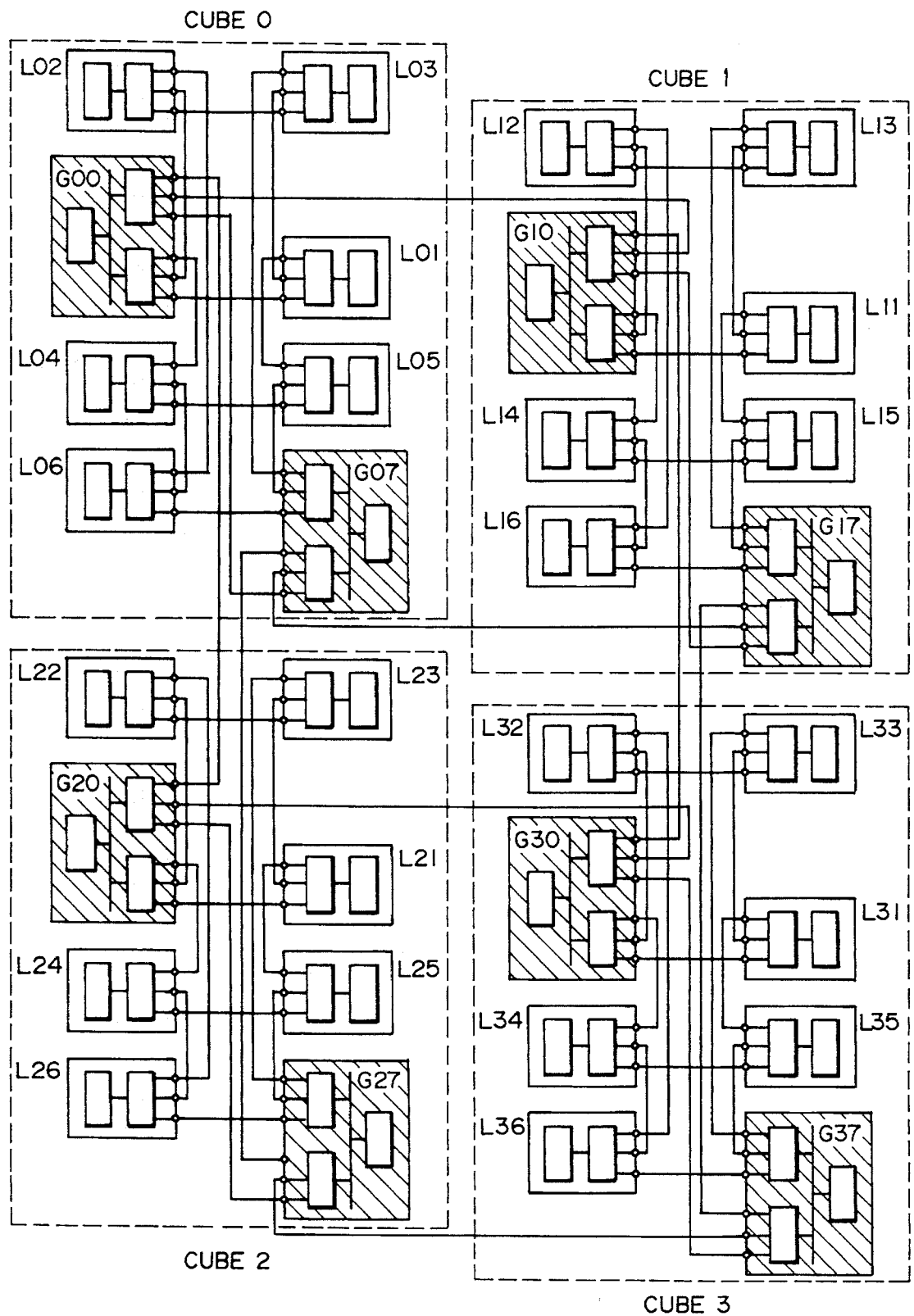
FIG. 9 is a block diagram illustrating the configuration of a multi-stage coding cube network multiprocessor system to which the multi-stage coding cube network shown in FIG. 4 is applied.
Figure 10A:
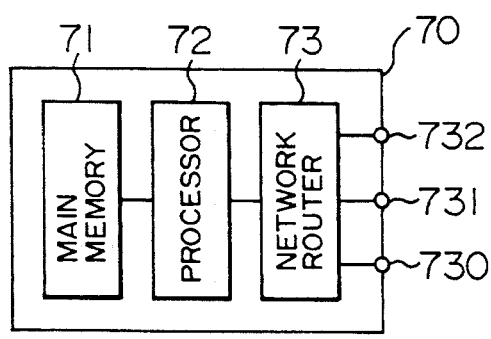
FIGS. 10A and 10B are diagrams respectively illustrating the configuration of a leaf node and a gate node in a multiprocessor system employing the multi-stage coding cube network.
Figure 10B:
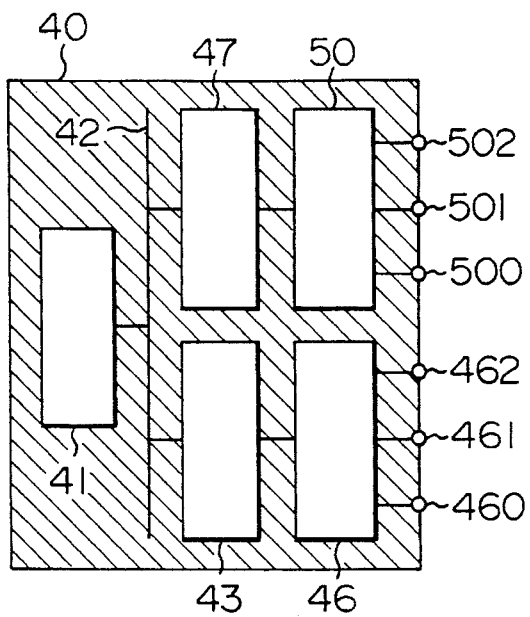

FIG. 9 is a block diagram illustrating in detail the multiprocessor system applying a two-stage coding cube network shown in FIG. 4. Cube 0 to cube 3 configure a first stage cube, where L02-L36 designate leaf nodes, each of which comprises a processor module. The processor module is composed of a main memory 71, a processor 72, a network router 73, and a network channel 73 for connection in the same cube, as shown in FIG. 10A. Gate nodes G00-G37 each comprise a multiprocessor module as shown in FIG. 10B. The multi-processor module of FIG. 10B is illustrated in greater detail in FIG. 11. Turning back to FIG. 9, the cube 0-cube 3 configure the first stage cube, and a cube including the gate nodes G00-G37 configures the second stage cube. Communication paths between leaf nodes are indicated by thin lines, while communication paths between gate nodes are indicated by thick lines.

Figures 12A, 12B:
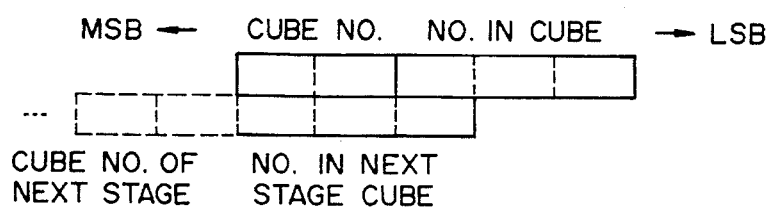
FIGS. 12A and 12B is a table listing a processor number, a cube number, a number in the cube, a number in the cube in the next stage of a processor unit which is located at each node of FIG. 11.

FIGS. 12A and 12B show, as a table, the processor number located in each node, cube number, number in cube, and cube number of next stage. The cube number of next stage is given only to basic three-dimensional cubes whose number in cube is 0 (000) or 7 (111). If four additional next stage cubes are further provided, the cube number of next stages are given thereto.

Figure 11:
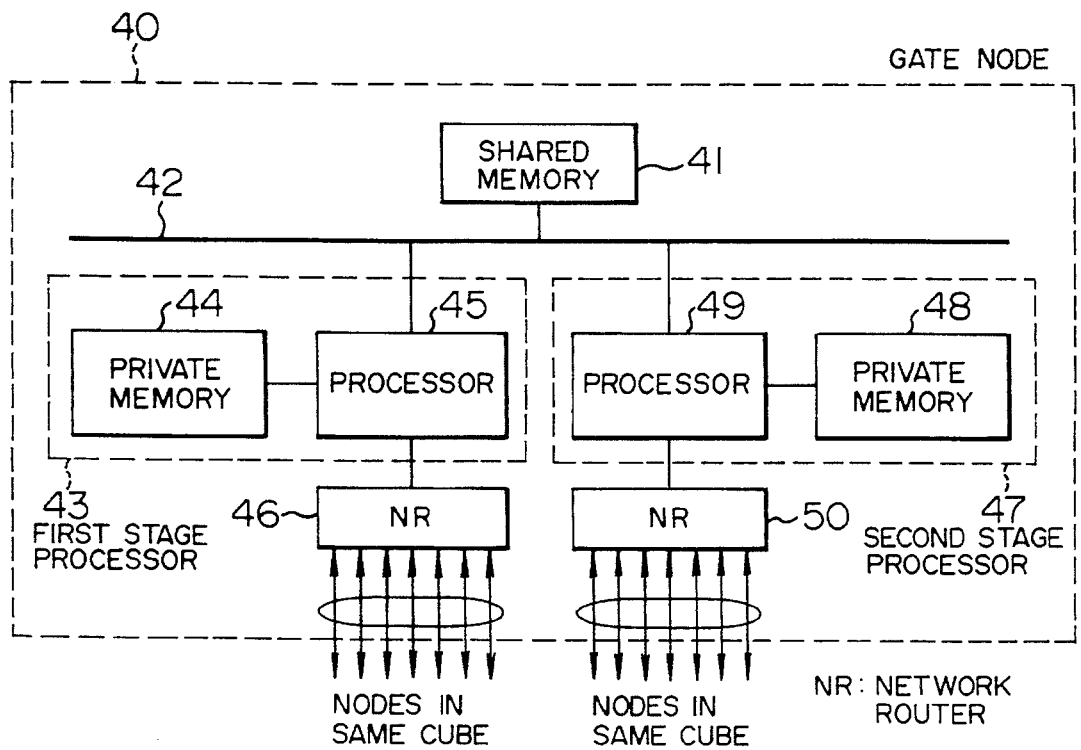
FIG. 11 is a diagram illustrating the configuration of an embodiment of a gate node in a multiprocessor system using a multi-stage coding cube network.

FIG. 11 illustrates an embodiment of a multiprocessor module used as a gate node in a multi-stage cube multiprocessor system. This embodiment shows the configuration of a first stage gate node. A gate node 40 is composed of a first stage processor 43; a second stage processor 47; a network router (NR) 46 on the first stage cube side; a network router 50 on the second stage cube side; an intercube connection bus 42 within the node for connecting these components; and a shared memory 41 for these processors 43, 47.

The first stage cube in the gate node, i.e., the processor 43 belonging to the first stage layer has a processor 45 and a private memory 44, while the second stage cube in the gate node, i.e., the processor 47 belonging to the second stage layer has a processor 49 and a private memory 48.

Data in the same cube is transferred through the private memory in the processor. On the other hand, data transfer between cubes in different layers is performed through the shared memory 41. By thus realizing a gate node by a multiprocessor module, it is possible to readily expand to a gate node having more stages. For example, for expanding the first stage gate node of this embodiment to a second stage gate node, a processor belonging to the third stage cube may be connected to the intercube connection bus 42.

While the gate node of this embodiment is implemented by a main memory shared close coupling multiprocessor configuration by bus coupling, the gate node may of course be realized by a distributed memory type multiprocessor configuration which does not have a shared memory. Alternatively, if the expansibility is sacrificed, any problem will not arise even if the gate node is separately designed as a single processor employing a different processor and a different network router from those of the leaf node. In this case, a processor which may be employed as the gate node is required to have network connection channels, the number of which is an integer multiple of the number of processors employed in a leaf gate, depending on to which stage the gate node belongs.

Figure 13A:
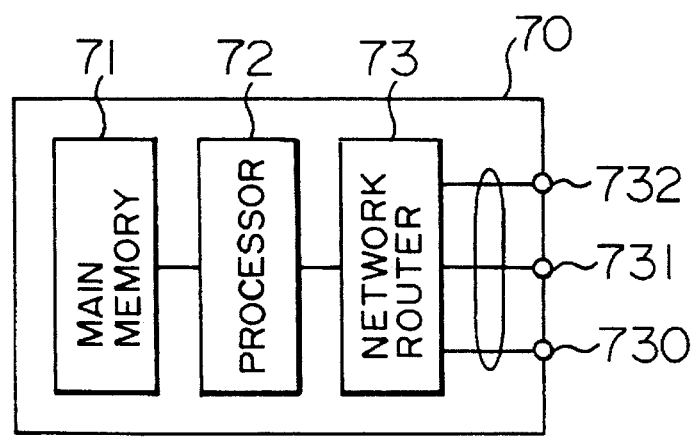
FIGS. 13A and 13B are diagrams illustrating a leaf node and a gate node according to another embodiment.
Figure 13B:
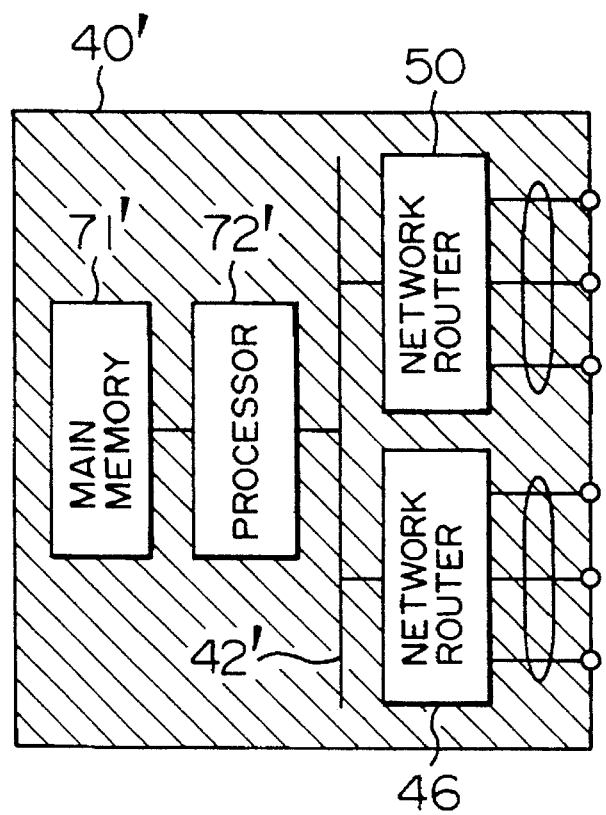

FIGS. 13A and 13B illustrate another embodiment of a node unit. In this embodiment, a leaf node is composed of a memory 71, a processor 72 for processing data, and a network router (NR) 73 for controlling data communications between nodes, as shown in FIG. 13A. A gate node has a plurality of network routers 46, 50 for controlling message flows in networks of the respective layers, each of which controls a network in each layer. A data transfer from one layer to another is performed through a bus 42' which connects between the network routers 46, 50. In this embodiment, data at a node on a transfer path is transferred only through the network routers 46, 50 without being fetched by the processor, thereby avoiding the influence on the operation of processors existing on the transfer path. Also, if additional network routers are provided, the node unit of this embodiment can support the expansion of the network.

Figure 14A:
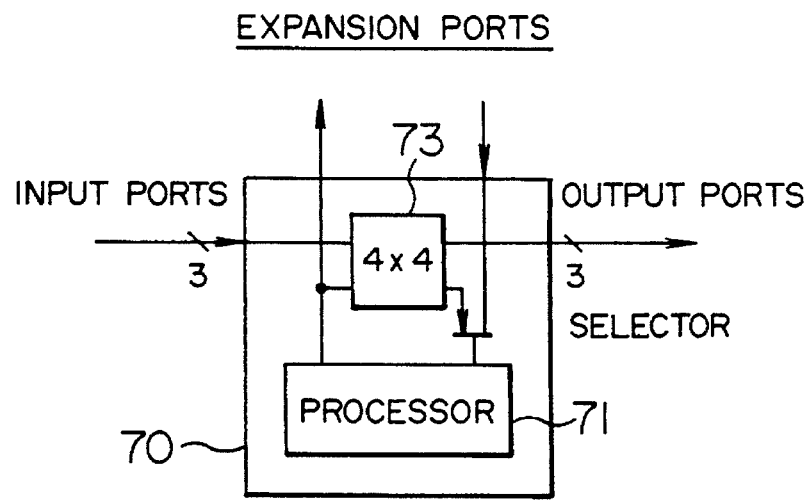
FIGS. 14A and 14B are block diagrams illustrating embodiments of a leaf node and a gate node of the network according to the present invention.
Figure 14B:
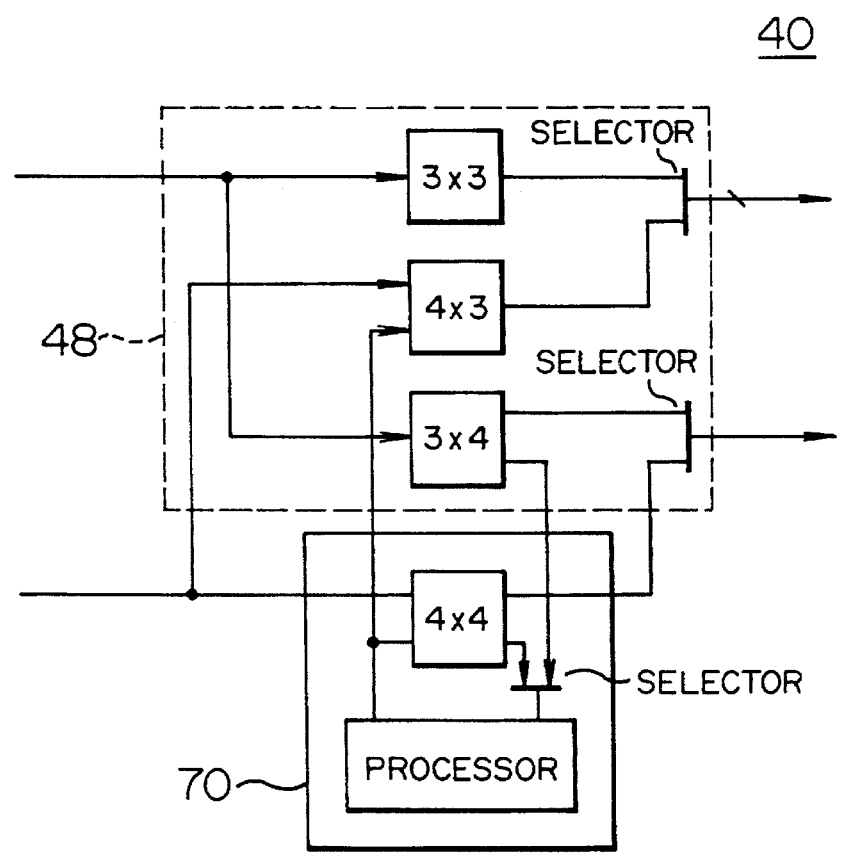

FIG. 14B illustrates a further embodiment of the gate node. In the network of the present invention, networks on a plurality of layers converge at a gate node. When an m-dimensional hypercube is used as a basic cube, the total number of links outputted from a $i^{th}$ stage gate node is calculated by $(m \times (i+1))$ ($i \geq 0$: $i=0$ represents a leaf node). Considering that a network router for controlling these links requires a further link for fetching data in its own processor, such a network router may be realized by a crossbar switch having $(m \times (i+1)+1)$ of input and output lines.

FIGS. 14A and 14B illustrate the configurations of embodiments of leaf and gate nodes in a network which employs a three-dimensional hypercube as a basic cube. This embodiment employs, as a basic module, a module having a processor, a first stage network router (4×4 crossbar switch) and an expansion port selector for connecting to an upper layer network. A leaf node is implemented by the basic module as it is, as shown in FIG. 14A. On the other hand, a gate node is composed of the basic module and an expansion switch module 48. In this embodiment, a 7×7 crossbar switch required to constitute the first stage network router is divided into (4+3)×(4+3), and composed of a 4×4 crossbar; a 4×3 crossbar; a 3×4 crossbar; and a 3×3 crossbar, wherein output signal lines of the respective crossbars are coupled by the selector. Since the 4×4 crossbar switch among these switches is built in the basic module, an expansion module including the remaining three crossbars and two selectors is connected to an expansion port of the basic module.

In this embodiment, since the basic module can be commonly utilized by all nodes, the production cost of the basic module can be reduced. Also, by using divided crossbars to implement the network router required to constitute the gate node, a bottleneck of the network router caused by pins can be solved. Generally, a p×p crossbar switch may be divided into (q+r)×(s+t) (q+r=s+t=p), and realized by four crossbars of q×s, q×t, r×s and r×t and selectors for coupling these crossbars. It will be apparent that this crossbar switch dividing method is applicable to other cases than the configuration of a network router.

Figure 15:
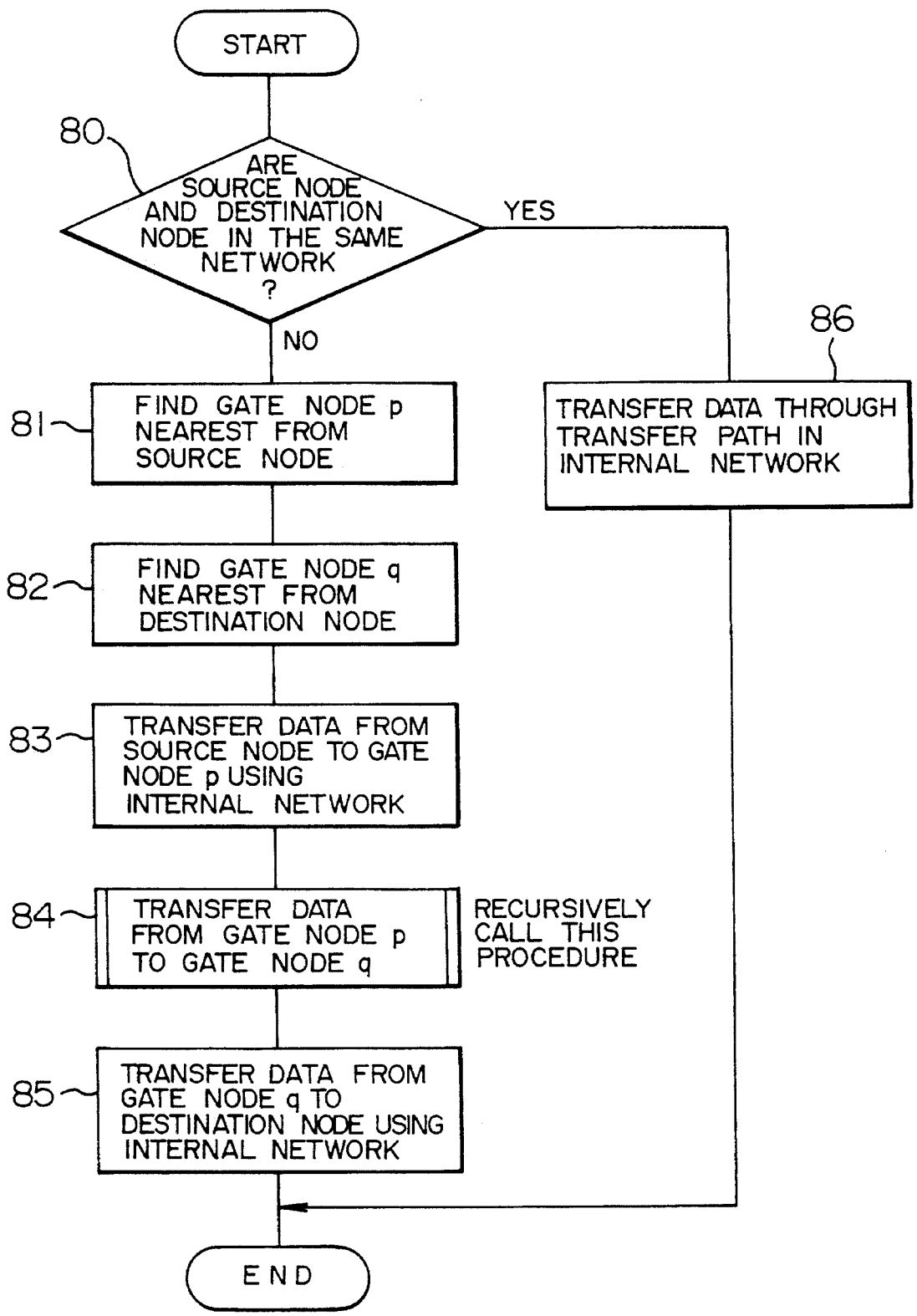
FIG. 15 is a flow chart illustrating a data transfer procedure according to the present invention.

Next, a data transfer procedure according to the present invention will be described with reference to FIG. 15. During data transfer, a source node and a destination node are set in a message. The data transfer is executed by processing 80 for determining whether or not the source node and the destination node are in the same network; processing 86 for transferring data through a transfer path within the network if these nodes are in the same network; processing 81 for finding the gate node p nearest from the source node when they are not in the same network; processing 82 for finding the gate node q nearest from the destination node; processing 83 for transferring data from the source node to the gate node p through an internal network; processing 84 for transferring data from the gate node p to the gate node q through a network in the one stage upper layer; and processing 85 for transferring data from the gate node q to the destination node through an internal network including the same. The transfer of data from the gate node p to the gate node q is executed by recursively calling this procedure.

Figure 16:
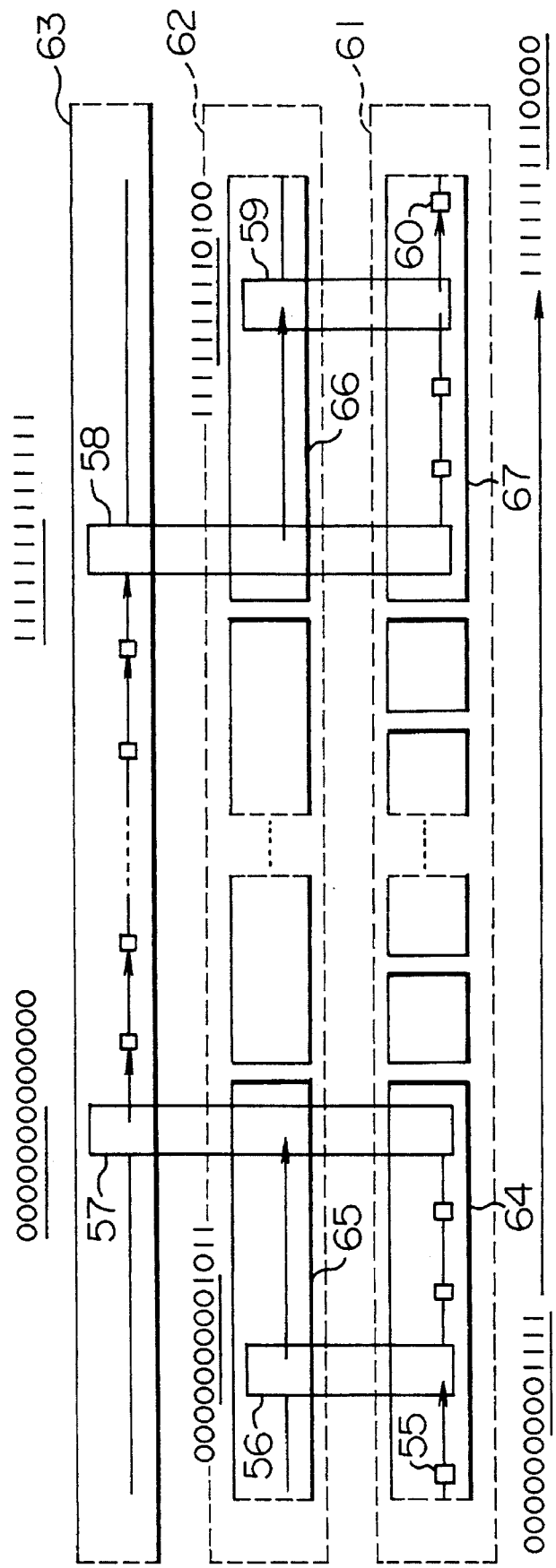
FIG. 16 is a diagram for explaining how data is transferred between nodes in a multi-stage coding cube network.

FIG. 16 is a diagram for explaining how data is transferred between nodes in a multi-stage coding cube network. FIG. 16 illustrates an example where a transfer distance is maximum in internode communications in a three-stage (7, 4) coding cube network.

Each node is numbered in the following manner. Referring to FIG. 7B, the three-stage (7, 4) coding cube network is configured with seven-dimensional cubes serving as basic cubes which are built in three stages. There are 8,192 (128×64) nodes so that the node number can be expressed by 13 bits. The lower seven bits of the node number indicate the address in the basic cube. If a (7, 4) code, the upper four bits of which are information bits, and the lower three bits of which are correcting bits, is selected therefrom, 16 code words, the upper four bits of which range from 0000 to 1111, can be selected.

Then, by further adding three bits to the upper side of these upper four bits, a node in the second stage seven-dimensional cubes can be specified. The number of the second stage seven-dimensional cubes is eight, and the number of nodes, i.e., the number of the first stage gate nodes is 1,024 (16×64=128×8). Expansion to the third stage cube is also realized by using a similar method. The number of the third stage seven-dimensional cube is one, and the number of nodes, i.e., the number of the second gate nodes are 128 (16×8).

By the foregoing procedure, the upper seven bits of the node number represent the address in the third cube; the fourth to tenth bits on the upper side represent the address in the second stage cube; and the seventh bit from the upper side to the least significant bit represent the address in the first cube. The allocation of the address is performed, by way of example, in the following manner:

A seven-bit address (the seventh bit on the upper side to the least significant bit) is allocated to nodes in the first stage cube, wherein the upper four bits of these seven bits are information bits, and the lower three bits are error correcting bits. Seven bits of non-error code are allocated to the gate node. While seven bits consisting of fourth to tenth bits on the upper side are allocated to nodes in each basic cube in the second stage (the first stage gate nodes) as the address, three bits consisting of third to tenth bit on the upper side, which have already been allocated to nodes in each basic cube in the first stage, are left unchanged, and the remaining four bits (from fourth to sixth bits on the upper side) are allocated to represent the address. The allocation of the address to nodes in the third stage cube (second stage gate nodes) is performed similarly to the allocation of address in the second stage.

A string of the 13 bits thus determined serves as the node number.

Now, a transfer procedure will hereinafter be described with reference to the node number thus determined.

FIG. 16 shows paths through which data is transferred from a leaf node 55 (node number 0000000001111) to a leaf node 60 (1111111110000). The leaf node 55 belongs to the $0^{th}$ cube of a first stage cube group 61, while the leaf node 60 belongs to the $63^{th}$ cube of the first stage cube group 61. Therefore, for performing communications between these nodes, it is necessary to use a network between upper cubes.

For this purpose, data has to be first transferred to the gate node nearest from the leaf node 55. Since the gate nodes in the basic cube are selected using a one-error correcting code, where the distance therebetween is 3, a gate node must exist at a location spaced by distance 1 from each leaf node. Therefore, a gate node for an arbitrary node belonging to a hypercube in each stage can be readily found by regarding the binary address allocated to the node in the cube as a code, and correcting the address using an error correcting method established in the coding theory.

Specifically explaining, the address of the leaf node 55 in the first stage cube is (0001111). When an error correction is performed on this address, the resulting bit string is (001011), thus reaching a gate node 56 (the node number of which is 000000001011). In the same way, a gate node for the leaf node 60 or the destination node can be found to be a gate node 59 (the node number of which is 1111111110100).

If the gate nodes thus found are in the same cube, data transfer can be accomplished using a hypercube in that layer to which these gate nodes belong. However, in this example, the gate node 56 exists in different cubes (cube number 0) and 66 (cube number 7) in the second stage cube group 62. For this reason, it will be understood that a transfer between these nodes requires an upper layer cube.

On the other hand, the gate nodes 56 and 59 are first stage gate nodes as well as leaf nodes in the second stage cube. Therefore, for connecting these gate nodes 56, 59 to the third stage cube, data should be transferred to a gate node in the second stage cube for these nodes, i.e., the second stage gate node.

The address of the gate node 56 in the second stage cube 65 is (0000001). When an error correction is performed on this address, the resulting bit string becomes (0000000), thereby making it possible to find a second stage gate node 57 to which data is to be transferred. Thus, data is transferred from the first stage gate node 56 to the second stage gate node 57 (the node number of which is 0000000000000). Similarly, a gate node corresponding to the node 59, which is the destination node in the second stage cube group, is readily found to be a second stage gate node 58 (the node number of which is 1111111111111).

These second stage gate nodes are nodes in a third stage cube 63, and their addresses in this cube are 0000000 and 1111111, respectively, so that if the transfer is performed seven times in the third stage cube, the leaf node 55 can communicate with the leaf node 60.

From the foregoing, for a data transfer from the leaf node 55 to the leaf node 60, data is first transferred through the gate noes 56, 57 to the third stage cube in which the transfer is performed seven times to reach the gate node 58. Afterward, the data is transferred through the gate node 59 to the leaf node 60. The total number of these steps for this transfer is 11, assuming that a transfer between nodes is defined to be one step. This transfer distance is a maximum transfer distance in the three stage (7, 4) coding cube network. A hypercube having the same number of nodes presents a maximum transfer distance of 13, whereby it is apparent that the multi-stage coding cube network requires a shorter transfer distance.

Comparison of Network Performance

In the following, description will be made as to the evaluation results with respect to hardware amount and transfer distance of a conventional network and the multi-stage coding cube network of the present invention. Evaluated here are a hypercube, an octal n-dimensional hyper crossbar (HXB), a two-dimensional torus network, a binary tree network, a multi-stage majority operation coding cube network (hereinafter referred to as "the (3, 1) CCN") employing a three-dimensional hypercube as a basic cube, and a multi-stage (7, 4) coding cube network employing a seven-dimensional hypercube as a basic cube (hereinafter referred to as "the (7, 4) CCN). The configurations of the above networks are described below except for the multi-stage coding cube network.

(1) Hypercube

Figure 17A:
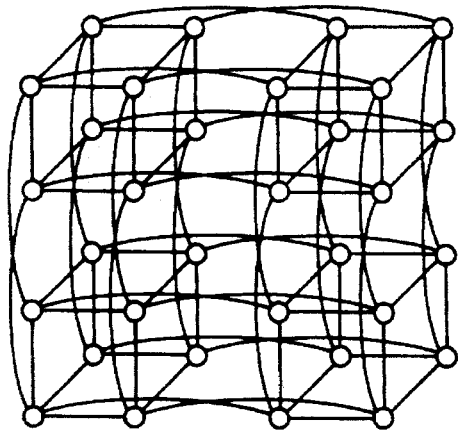
FIGS. 17A–17D are diagrams illustrating the configurations of a variety of networks.

FIG. 17A illustrates the configuration of a five-dimensional hypercube. Each node in an n-dimensional hypercube has n links and connected to n nodes with the Hamming distance being 1. The Hamming distance refers to the number of different bits between two node numbers when they are expressed in a binary code. For example, the Hamming distance of node numbers 20 (=00010100) and 54 (=00110110) is 2.

(2) Hyper Crossbar

Figure 17B:
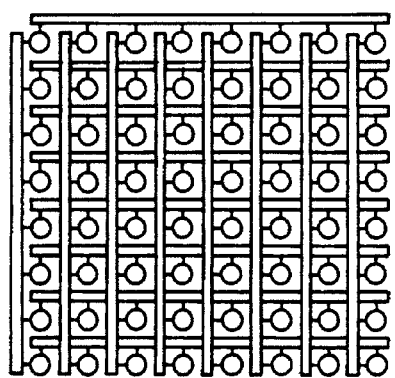

FIG. 17B illustrates the configuration of an 8×8 two-dimensional hyper crossbar. Each node has two links and is connected to an 8×8 crossbar switch in the horizontal direction and an 8×8 crossbar switch in the vertical direction, respectively. Generally, a d-dimensional hyper crossbar in $p_1 \times p_2 \times \ldots \times p_d$ configuration is a network in which $p_i$ codes in i directions of each dimension are coupled by a complete junction network (crossbar). Each node has d links.

(3) Torus Network

Figure 17C:
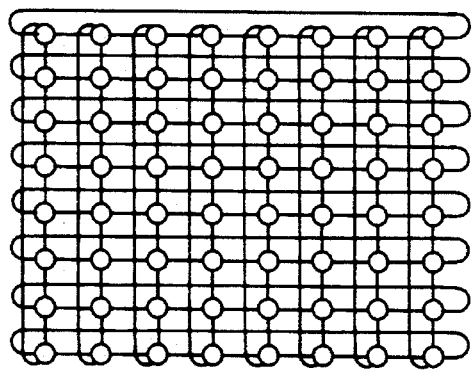

FIG. 17C illustrates the configuration of an 8×8 two-dimensional torus network. This is a network having eight nodes in the horizontal direction and eight nodes in the vertical direction respectively coupled in a cyclic manner. A d-dimensional torus network in $p_1 \times p_2 \times \ldots \times p_d$ configuration is a network where $p_i$ nodes in i directions of each dimension are coupled in a cyclic manner. Each node is connected with 2d links.

(4) Binary Tree Network

Figure 17D:
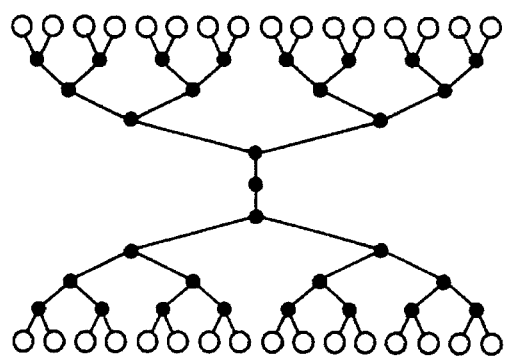

FIG. 17D illustrates the configuration of a binary tree network. The binary tree network has $2^n$ nodes and $2^n-1$ network routers. Each node has a link, while each network router has three links.

Next, the results of the evaluation will be described with respect to the number of average links per node and the number of intermodule links of the above networks.

Number of Average Links per Node

Figure 18B:
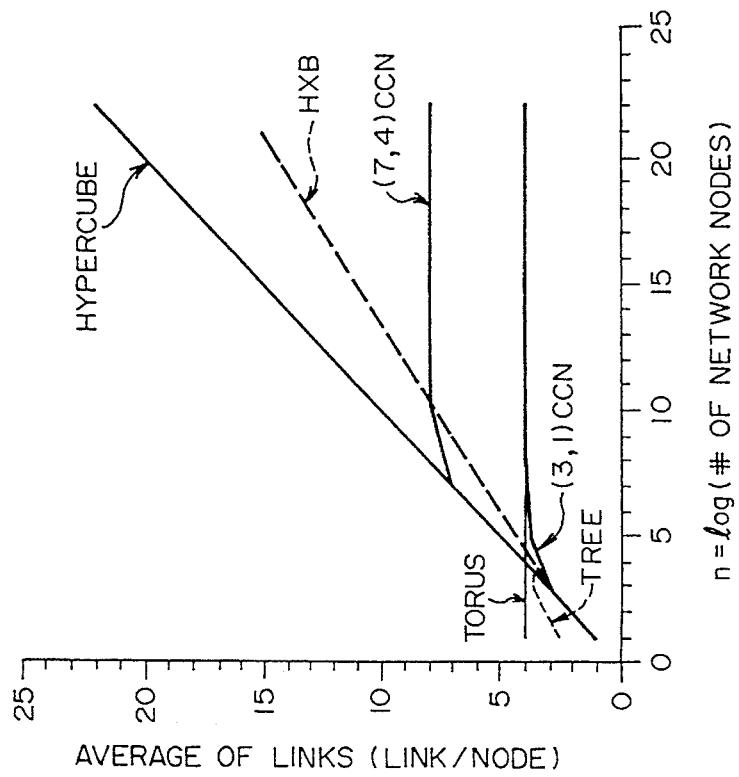
FIG. 18B is a graph showing the relationship between the number of network nodes and the number of average links per processor.

The number of links for connecting each node represents the number of pins of each LSI and a wiring amount when mounted. In an LSI for configuring a network, the number of pins may often cause difficulties. Therefore, the hardware cost of the networks are compared in terms of the number of average links per processor. A link is shared by two nodes. The number of average links is thus derived by doubling the total number of links of a network and dividing the product by the number of nodes. FIG. 18A is a table showing the number of average links of a variety of networks, and FIG. 18B is a graph where the abscissa represents the logarithm of the number of nodes of the networks and the ordinate represents the number of average links per processor. It can be seen from this result that the torus network, binary tree network and (3, 1) CCN generally have four links per node irrespective of the number of nodes included therein, while the (7, 4) CCN has about eight links per node. The hypercube and hyper crossbar in turn have links which increase in proportion to the logarithm of the number of nodes.

From the above result, it will be understood that, considering the mounting of hardware, the hierarchical network according to the present invention, binary tree network and torus network are desirable for a case where a large number of nodes are connected.

Number of Intermodule Links

Figure 19B:
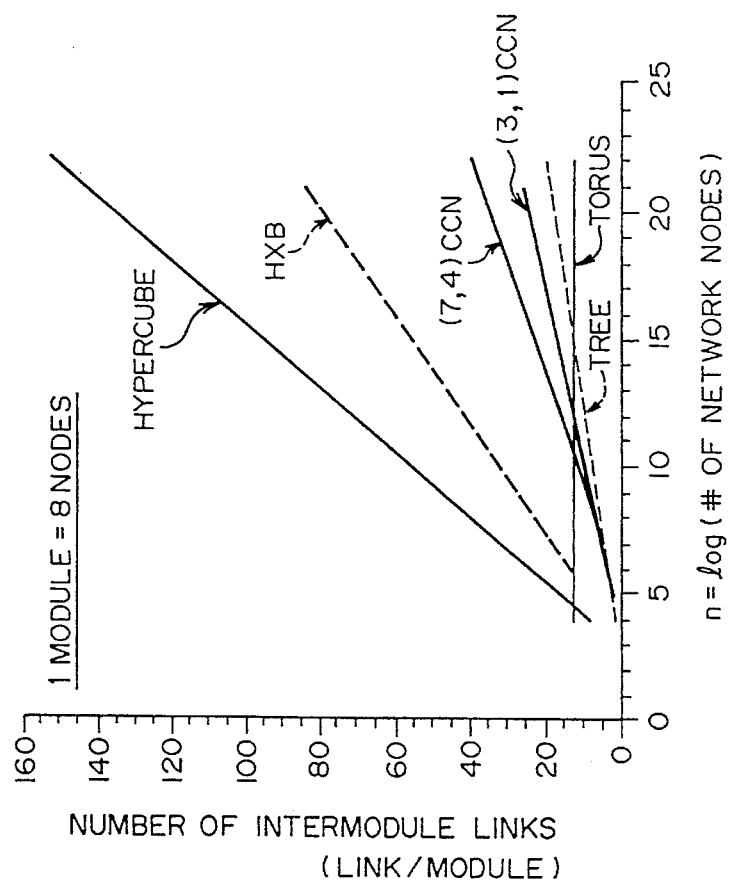
FIG. 19B is a graph showing the relationship between the number of network nodes and the number of intermodule links.

Thinking of a parallel computer implemented by a plurality of processors integrated in one chip or one module, the number of pins which can be outputted from the chip or module may cause problems. Therefore, in a large-scale parallel computer, a reduction of the number of intermodule links is essential. Then, the number of intermodule links when eight processors are integrated in a single module is evaluated for the respective networks. FIG. 19A is a table showing the calculation results, and FIG. 19B is a graph where the abscissa represents the logarithm of the number of network nodes, and the ordinate represents the number of intermodule links. It can be seen from this result that the hypercube and hyper crossbar require a larger number of intermodule links, while the hierarchical network according to the present invention, binary tree network and torus network can be realized by a relatively small number of links.

Average Transfer Distance

When random communications are performed for all nodes versus all nodes, collision of messages frequently occurs. In this case, a transfer time is largely affected by the number of collisions of messages. The number of collisions of messages increases as a transfer distance is longer. From these facts, the data transfer performance of various networks can be evaluated by comparing average transfer of the networks. Stated another way, it can be said that a network has a better transfer performance as its mean transfer distance is shorter.

Figure 20:
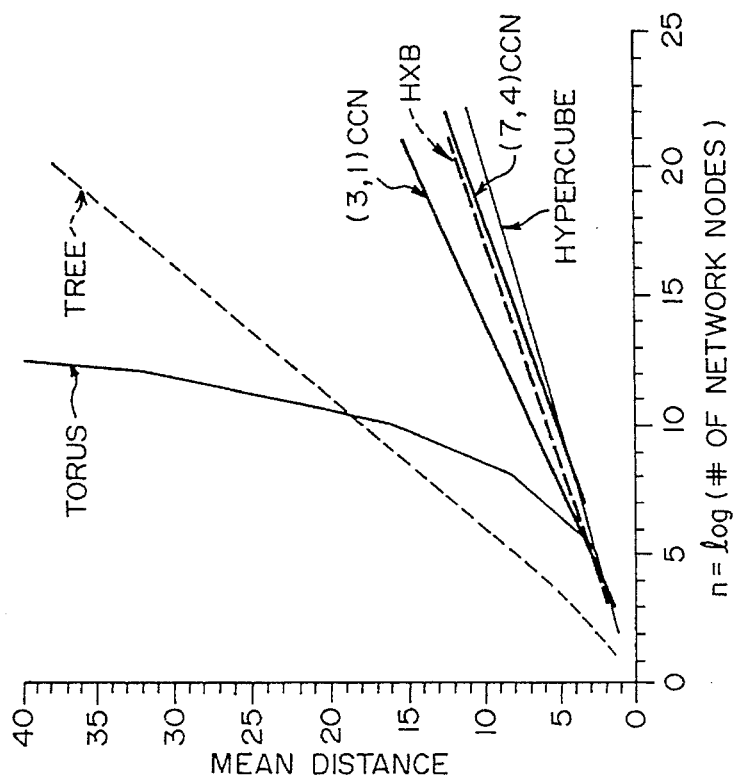
FIG. 20 is a graph showing the relationship between the number of network nodes and a mean transfer distance.

FIG. 20 is a graph where the abscissa represents the logarithm of the number of network nodes, and the ordinate represents a mean transfer distance of network. It can be seen from the graph that the hypercube presents the shortest transfer distance. When the transfer distance of the hypercube is defined to be 1, the (7, 4) CCN presents a mean transfer distance 1.1 times that of the hypercube; the hyper crossbar 1.2 times; the (3, 1) CCN 1.6 times; the binary tree network 3.8 times; and the torus network 16 times, assuming that each network comprises 64K nodes. This result reveals that the hypercube, (7, 4) CCN, hyper crossbar and (3, 1) CCN have high network transfer performance.

Next, a variety of networks were compared with each other as to the performance of these networks when configured with a fixed hardware cost, i.e., as to the cost performance of the networks. Supposing that a hardware cost of a network depends on a cost of links included in the network, if the hardware cost is fixed, the total number of links in the network is reciprocally proportional to a transfer speed (throughput) of each link.

Therefore, normalizing the distance of each link with a network cost being fixed, a transfer speed Lt of each normalized link is calculated by:

$$Lt = 1/(\text{Number of Average Links}) \quad (1)$$

A normalized mean transfer distance ND is therefore calculated by:

$$\begin{aligned} ND &= (\text{Mean Transfer Distance})/Lt \quad (2) \\ &= (\text{Mean Transfer Distance}) \times (\text{Number of Average Links}) \end{aligned}$$

Figure 21:
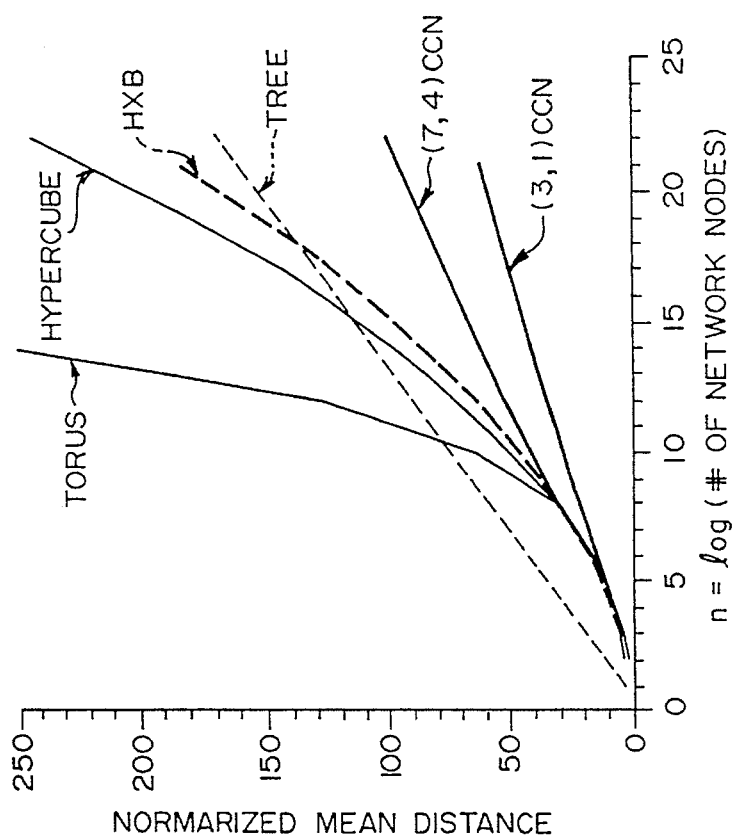
FIG. 21 is a graph showing the relationship between the number of processors and a normalized mean distance.

FIG. 21 is a graph where the abscissa represents the logarithm of the number of processors, and the ordinate represents a normalized mean distance. It can be understood from this result that the multi-stage coding cube network presents the shortest normalized mean transfer distance as compared with conventional networks. For example, assuming that a normalized mean transfer distance of the (3, 1) CCN comprising 64K nodes is 1, that of the (7, 4) CCN is 3.3; the hyper crossbar 5.1; the binary tree 5.5; the hypercube 5.9; and the torus network 23.6. It will be appreciated from this result that the hierarchical network according to the present invention presents extremely high cost performance as compared with other networks.

The above evaluations will ensure that the hierarchical network according to the present invention is used to realize a network with a low hardware cost and high transfer performance.

As is apparent from the foregoing performance comparison, the multi-stage coding cube network according to the present invention can largely reduce the number of internode connection links as compared with conventional hypercubes. For example, the four-stage (7, 4) coding cube network, has the total number of nodes equal to $2^{(7+(7-4)\cdot(4-1))}$, i.e., $2^{16}$ and the number of internode connection links equal to 262,080, which is approximately half the number of internode connection links required to a 16-dimensional hypercube having the same number of nodes which is equal to 524,288. Generally, the number of internode connection links in a multi-stage coding cube network having the number of nodes equal to $2^n$ is approximated by:

$$(p/(p-1))\cdot(2^n)\cdot m/2$$

where m represents the number of dimensions of a basic hypercube, and p the number of basic hypercubes to be collected to a one-layer upper hypercube. Since p and m are constants which are depending on a coding to be applied, the number of internode connection links in a multi-stage coding cube network increases only in proportion to the number of nodes existing in the network.

Also, the multi-stage coding cube network according to the present invention, when employed in a multiprocessor system, enables a large-scale multiprocessor system to be built at a low cost by virtue of a large reduction of interprocessor connection networks. Particularly, since expansion of the system is carried out only by expanding processors corresponding to gate nodes, its system expansibility is highly appreciated.

The present invention can largely reduce the number of intermodule connection paths when the basic hypercubes are mounted on a single module, and such modules are combined to build a large network. For example, in the foregoing multi-stage (7, 4) coding cube network using a seven-dimensional hypercube as a basic cube, when the number of nodes is equal to $2^{16}$, the number of intermodule connection lines is 67, which is sufficiently feasible when 128 processors are mounted in a single chip. On the other hand, if 16-dimensional hypercubes are mounted with a seven-dimensional hypercube used as a basic cube, the number of intermodule connection pats is 1152, whereby the difference between the present invention and the prior art is obvious.

Further in the present invention, a gate node unit in a multi-stage coding cube network is composed of multiple processors which share a main memory, whereby the function of the gate node unit can be expanded only by adding processor module boards. This enables the system to be expanded only by adding thereto a processor board, a network board and so on without modifying hardware of a previous system.

When the multi-stage coding cube network according to the present invention is applied, an internode communication time can be reduced as compared with a hypercube. For example, the foregoing four-stage (7, 4) coding cube network presents an internode maximum distance equal to 13 which is smaller than an internode maximum distance equal to 16 of a hypercube having the same number of processors. Also, the number of steps required for broadcast for the whole system is also reduced corresponding thereto. If a broadcast node is assigned to a node belonging to the top-layer hypercube, the number of steps is further reduced. For example, in the foregoing example, if the broadcast node is set in a fourth-stage hypercube, the broadcast can be executed by 10 steps.

What is claimed is:

1. A hierarchical network comprising:

a plurality of lower layer networks, each of said lower layer networks being a p-array, n-cube network where p and n are integers greater than 1, and connecting a plurality of nodes provided for each lower layer network, wherein part of said plurality of nodes are selected as a plurality of gate nodes in said each lower layer network; and an upper layer network being a p-array, n-cube networks where p and n are integers greater than 1, and connecting a group of gate nodes selected for said plurality of lower layer networks;

wherein said plurality of lower layer networks, said upper layer network and said group of gate nodes establish communication between nodes belonging to different lower layer networks, in such a manner that communication provided by a first node included in a plurality of nodes connected by a first one of said plurality of lower layer networks is first relayed by way of said first lower layer network to a first gate node included in a plurality of gate nodes selected for said first lower layer network, said first gate node being nearest to said first node among said plurality of gate nodes selected for said first lower layer network;

said communication is further relayed by said upper layer network to a second gate node included in a plurality of gate nodes selected for a second one of said plurality of lower level networks which connect a plurality of nodes which includes a second node to which said communication is to be transferred, said second gate node being one nearest to said second node among said plurality of gate nodes selected for said second lower layer network; and said communication is further transferred by way of said second lower layer network from said second gate node to said second node.

2. A hierarchical network according to claim 1, wherein each of said lower layer networks is an m-dimensional hypercube network, and said upper layer network is an n-dimensional hypercube network, where m is an integer equal to or more than two, and n is an integer equal to or more than two;

wherein a node number given to each node of each lower layer network includes a first number given to said each node to discriminate said each node from other nodes within said each lower layer network, and a second number given to said each lower layer network to discriminate said each lower layer network from other lower layer networks, wherein a plurality of nodes within each lower layer network each of which has a first node number which coincides with an error correcting code word which can be generated by t-multiplexed error correcting codes are selected as a plurality of gate nodes for said each lower layer network, wherein t is an integer equal to or greater than one.

3. A hierarchical network according to claim 1, wherein:

each of said lower layer networks is an m-dimensional hypercube, and said upper layer network is an m-dimensional hypercube, where $m \geq 2$.

4. A hierarchical network according to claim 3, wherein:

each of said m-dimensional hypercubes comprises one or more cells, each of said cells including a plurality of said nodes, wherein, assuming that a node number includes a number given to a node in a cell and a number given to the cell arranged in this order from the least significant bit thereof, a node having a node number corresponding to a non-error t-multiplexed error correcting code is selected as the gate node.

5. A hierarchical network according to claim 1, wherein:

arbitrary two of said plurality of nodes in said lower networks are connected by a plurality of communication paths.

6. A multiprocessor system according to claim 1, wherein:

each of said lower layer networks comprises one or more cells, each of said cells including a plurality of said nodes; and at least two of said gate nodes are selected from each cell, one of the gate nodes placed at corresponding positions in each cell of each lower layer network is individually connected to the other one, and said one gate node is mutually connected with the corresponding gate nodes in the other cells.

7. A hierarchical network according to claim 1:

wherein a plurality of gate nodes selected for each lower layer network are ones which give any node other than said plurality of gate nodes within a plurality of nodes connected by said each lower layer network, a same communication distance to a nearest gate node, in a sense that a communication distance between said any node other than said plurality of gate nodes and one of said plurality of gate nodes nearest to said any node among said plurality of gate node is same with said nodes other than said plurality of gate node.

8. A hierarchical network comprising:

a plurality of lower layer networks, each of said lower layer networks being a p-array, n-cube network where p and n are integers greater than 1, and connecting a plurality of nodes provided for said each lower layer network, wherein part of said plurality of nodes are selected as a plurality of gate nodes for said each lower layer network; and an upper layer network being a p-array, n-cube network where p and n are integers greater than 1, and connecting a group of gate nodes selected for said plurality of lower layer networks;

wherein said plurality of lower layer networks, said upper layer network and said group of gate nodes establish communication between nodes belonging to different lower layer networks, in such a manner that communication provided by a first node included in a plurality of nodes connected by a first one of said plurality of lower layer networks is first relayed by way of said first lower layer network to a first gate node included in a plurality of gate nodes selected for said first lower layer network, said first gate node being nearest to said first node among said plurality of gate nodes selected for said first lower layer network;

said communication is further relayed by way of said upper layer network to a second gate node included in plurality of gate nodes selected for a second one of said plurality of lower level network which connects a plurality of nodes which includes a second node to which said communication is to be transferred, said second gate node being one nearest to said second node among said plurality of gate nodes selected for said second lower layer network; and said communication is further transferred by way of said second lower layer network from said second gate node to said second node, wherein each of leaf nodes connected by each lower layer network includes the following, leaf nodes being nodes other than gate nodes,:

a private memory;

a processor connected to said private memory; and a network router connected to said processor and said each lower layer network; and wherein each of gate nodes selected for said each lower layer network includes:

a bus, a shared memory connected to said bus, two processors connected to said bus, a first network router connected to one of said two processors and said each lower layer network, and a second network router connected to another of said two processors and said upper layer network.

9. A hierarchical network comprising:

a plurality of lower layer networks, each of said lower layer networks being a p-array, n-cube network where p and n are integers greater than 1, and connecting a plurality of nodes provided for said each lower layer network, wherein part of said plurality of nodes are selected as a plurality of gate nodes for said each lower layer network; and an upper layer network being a p-array, n-cube network where p and n are integers greater than 1, and connecting a group of gate nodes selected for said plurality of lower layer networks;

wherein said plurality of lower layer networks, said upper layer network and said group of gate nodes establish communication between nodes belonging to different lower layer networks, in such a manner that communication provided by a first node included in a plurality of nodes connected by a first one of said plurality of lower layer networks is first relayed by way of said first lower layer network to a first gate node included in a plurality of gate nodes selected for said first lower layer network, said first gate node being nearest to said first node among said plurality of gate nodes selected for said first lower layer network;

said communication is further relayed by way of said upper layer network to a second gate node included in a plurality of gate nodes selected for a second one of said plurality of lower level network which connects a plurality of nodes which includes a second node to which said communication is to be transferred, said second gate node being one nearest to said second node among said plurality of gate nodes selected for said second lower layer network; and said communication is further transferred by way of said second lower layer network from said second gate node to said second node, wherein each of leaf nodes connected by each lower network includes the following, wherein leaf nodes are nodes other than gate nodes:

a first private memory, a processor connected to said first private memory, and a network router connected to said processor and said each lower layer network;

wherein each of gate nodes selected for said each lower layer network includes:

a second private memory, a processor connected to said second private memory, a bus connected to said processor, a first network router connected to said bus and said each lower layer network, and a second network router connected to said bus and said upper layer network.

10. A hierarchical network comprising:

a plurality of lower layer networks, each of said lower layer networks being a p-array, n-cube network where p and n are integers greater than 1, and connecting a plurality of nodes provided for said each lower layer network, wherein part of said plurality of nodes are selected as a plurality of gate nodes for said each lower layer network; and an upper layer network being a p-array, n-cube network where p and n are integers greater than 1, and connecting a group of gate nodes selected for said plurality of lower layer networks;

wherein said plurality of lower layer networks, said upper layer network and said group of gate nodes establish communication between nodes belonging to different lower layer networks, in such a manner that communication provided by a first node included in a plurality of nodes connected by a first one of said plurality of lower layer networks is first relayed by way of said first lower layer network to a first gate node included in a plurality of gate nodes selected for said first lower layer network, said first gate node being nearest to said first node among said plurality of gate nodes selected for said first lower layer network;

said communication is further relayed by way of said upper layer network to a second gate node included in a plurality of gate nodes selected for a second one of said plurality of lower level network which connects a plurality of nodes which includes a second node to which said communication is to be transferred, said second gate node being one nearest to said second node among said plurality of gate nodes selected for said second lower layer network; and said communication is further transferred by way of said second lower layer network from said second gate node to said second node;

wherein each of leaf nodes connected by each lower layer network includes a processor module, wherein leaf nodes being nodes other than gate nodes;

wherein said processor module includes:

a processor, and a network router connected to said processor, said input port, and said output port for selectively transferring an input signal provided from either one of said each lower layer network and said processor to either one of said processor and said each lower layer network;

wherein each of said gate nodes selected for said each lower layer network includes:

a processor module, and an expansion network router provided outside of said processor module and connected to said processor module, said upper layer network and said each lower network;

wherein said processor module included in said each gate node includes:

a processor, a selector, a network router connected to said processor, said each lower network, said expansion network router for selectively transferring an input signal from either one of said each lower layer network and said processor to either one of said selector and said each lower layer network;

wherein said selector is connected to said network router, said expansion network router and said processor, and selectively transfers an input signal from either one of said network router and said expansion network router to said processor;

wherein said expansion network router selectively transfers an input signal from either one of said upper layer network, said each lower layer network and said processor to either one of said upper layer network, said each lower layer network and said selector.

* * * * *